(12) United States Patent
Iwamatsu et al.

(10) Patent No.: US 9,363,316 B2
(45) Date of Patent: Jun. 7, 2016

(54) APPARATUS AND METHOD FOR CONTROLLING ACCESS TO A DISK APPARATUS IN AN INFORMATION PROCESSING SYSTEM

(71) Applicant: FUJITSU LIMITED, Kawasaki-shi, Kanagawa (JP)

(72) Inventors: Noboru Iwamatsu, Kawasaki (JP); Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 14/260,667

(22) Filed: Apr. 24, 2014

(65) Prior Publication Data
US 2014/0359210 A1 Dec. 4, 2014

(30) Foreign Application Priority Data
Jun. 4, 2013 (JP) .................................. 2013-117527

(51) Int. Cl.
*G06F 12/00* (2006.01)
*G06F 13/00* (2006.01)
*H04L 29/08* (2006.01)
*G06F 3/06* (2006.01)

(52) U.S. Cl.
CPC ............ *H04L 67/1097* (2013.01); *G06F 3/067* (2013.01); *G06F 3/0625* (2013.01)

(58) Field of Classification Search
None
See application file for complete search history.

(56) References Cited

U.S. PATENT DOCUMENTS

| | | | | |
|---|---|---|---|---|
| 5,930,824 A | * | 7/1999 | Anglin | G06F 11/1469 345/418 |
| 7,934,251 B2 | * | 4/2011 | Hesselink | H04L 63/0209 707/609 |
| 8,028,040 B1 | * | 9/2011 | Hobbs | G06F 9/45558 370/389 |
| 2004/0143712 A1 | * | 7/2004 | Armstrong | G06F 9/544 711/152 |
| 2006/0101189 A1 | * | 5/2006 | Chandrasekaran | G06F 8/63 711/6 |
| 2007/0174659 A1 | | 7/2007 | Takuwa et al. | |
| 2010/0250877 A1 | * | 9/2010 | Gaither | G06F 9/4856 711/162 |
| 2012/0174097 A1 | * | 7/2012 | Levin | G06F 9/5077 718/1 |

FOREIGN PATENT DOCUMENTS

JP 2007-164394 6/2007
JP 2011-257793 12/2011

* cited by examiner

*Primary Examiner* — Sean D Rossiter
(74) *Attorney, Agent, or Firm* — Staas & Halsey LLP

(57) ABSTRACT

An information processing apparatus including plural operation processing apparatuses and plural disk apparatuses, which are connected to each other via a switch. A management apparatus provides, in response to a loan request from a terminal, a first operation resource and a first storage resource of a first processing apparatus in which a first operation processing apparatus and a first disk apparatus are connected with each other through the switch, to the terminal through a network. The management apparatus releases the connection between the first operation processing apparatus and the first disk apparatus through the switch in response to a return request from the terminal and provides the first storage resource and a second operation resource of a second processing apparatus in which a second operation processing apparatus and the first disk apparatus are connected with each other through the switch, to the terminal through the network.

7 Claims, 21 Drawing Sheets

FIG. 7

USDB

| USER ID | LPID | NWID(LP) | IP ADDRESS RANGE (LP) | LSV LIST | IP ADDRESSES (LSTRG) | LSTRG NAME |
|---|---|---|---|---|---|---|
| US1 | 1 | 1001 | 172.16.10.0/24 | 0,1 | 172.16.10.254 | iqn.2013-03.net.US1:storagegw |
| US2 | 2 | 1002 | 172.16.19.0/24 | 0,1,2,3,4,5,6,7 | 172.16.19.254 | iqn.2012-11.net.US2:storagegw |
| : | : | : | : | : | : | : |
| SGW | 255 | 1255 | 172.16.31.0/24 | 0,1,2 | None | None |

FIG. 8

PSVDB

| PSV | MODEL | SERIAL NUMBER | STATE FLAG | RACK NUMBER | SLOT NUMBER | TOR NUMBER | TOR PORT NUMBER | SW PORT NUMBER |
|---|---|---|---|---|---|---|---|---|
| 0 | 2way SERVER | xxxxxxa | ON LOAN | 0 | 0 | 0 | 0 | 0 |
| 1 | 2way SERVER | xxxxxxy | EMPTY | 0 | 1 | 1 | 1 | 1 |
| 2 | 2way SERVER | xxxxxxc | ON LOAN | 0 | 2 | 2 | 2 | 2 |
| .. | .. | .. | .. | .. | .. | .. | .. | .. |
| 10 | 2way SERVER | xxxxxxf | ON LOAN | 0 | 10 | 10 | 10 | 10 |
| 11 | 2way SERVER | xxxxxxg | ON LOAN | 0 | 11 | 11 | 11 | 11 |
| .. | .. | .. | .. | .. | .. | .. | .. | .. |
| 31 | 2way SERVER | xxxxxxk | ON LOAN | 0 | 31 | 0 | 31 | 31 |
| .. | .. | .. | .. | .. | .. | .. | .. | .. |
| 63 (36+27) | 2way SERVER | xxxxxxm | EMPTY | 1 | 27 | 1 | 27 | 63 (36+27) |
| .. | .. | .. | .. | .. | .. | .. | .. | .. |
| 36n+m | 2way SERVER | xxxxxxp | EMPTY | n | m | n | m | 36n+m |

FIG. 9

DSKDB

| DISK | UNIQUE ADDRESSE | MODEL | CONNECTION PSV | ALLOCATION LP | ALLOCATION LSV | CONNECTION LDISK |
|---|---|---|---|---|---|---|
| 0 | 5000c50054bae5d9 | SSD 120GB | 0 | 2 | 1 | -1 |
| 1 | 5000c50054baf145 | SSD 120GB | -1 | -1 | -1 | -1 |
| 2 | 500e004aaa02001b | SSD 120GB | -1 | 2 | 2 | -1 |
| .. | .. | .. | .. | .. | .. | .. |
| 10 | 500e004aaa0600d6 | SSD 120GB | 10 | 1 | 0 | 1 |
| 11 | 5000c50054baf411 | SSD 120GB | -1 | -1 | -1 | -1 |
| 12 | 5000c50054baf412 | SSD 120GB | 2 | 1 | 1 | 2 |
| .. | .. | .. | .. | .. | .. | .. |
| 62 | 5000c50054baf522 | SSD 120GB | 11 | 2 | 3 | -1 |
| 63 | 500e004aaa0200f2 | .. | -1 | -1 | -1 | -1 |
| 64 | 5000c50054af405 | SSD 120GB | 2 | 1 | 1 | 3 |
| 65 | 5000c50054af407 | HDD 500GB | 0 | 2 | 1 | 2 |
| .. | .. | .. | .. | .. | .. | .. |
| 126 | 5000c50054baaa13 | HDD 500GB | 2 | 1 | 1 | 4 |
| 127 | 5000c50054baaa15 | HDD 500GB | 31 | 2 | 0 | 1 |
| .. | .. | .. | .. | .. | .. | .. |

FIG. 10

LSVDB

| LPID | LSVID | OS TYPE | ALLOCATION PSV | DISK LIST | LSTRG NAME LIST |
|---|---|---|---|---|---|
| 1 | 0 | OS-A-a | 10 | 10 | None |
| 1 | 1 | OS-A-b | 2 | 12,64,126 | None |
| 2 | 0 | OS-B-a | -1 | 127 | None |
| 2 | 1 | OS-B-a | 0 | 0,65 | None |
| 2 | 2 | OS-B-a | -1 | 2 | None |
| 2 | 3 | OS-B-a | 11 | 62 | None |
| .. | .. | .. | .. | .. | .. |
| 255 | 0 | SGW | 31 | None | iqn.2013-03.net.US1:storagegw iqn.2012-11.net.US2:storagegw |
| 255 | 1 | SGW | 63 | None | |
| 255 | 2 | SGW | -1 | None | |

FIG. 11

NSWDB

| SWITCH ID | SWITCH TYPE | RACK NUMBER | IP ADDRESSE |
|---|---|---|---|
| 0 | TOR-SW | 0 | 192.168.200.12 |
| 1 | TOR-SW | 1 | 192.168.200.13 |
| 2 | TOR-SW | 2 | 192.168.200.14 |
| .. | .. | .. | .. |
| x | EOR-SW | None | 192.168.200.60 |

FIG. 14

PSVDB

| PSV | MODEL | SERIAL NUMBER | STATE FLAG | RACK NUMBER | SLOT NUMBER | TOR NUMBER | TOR PORT NUMBER | SW PORT NUMBER |
|---|---|---|---|---|---|---|---|---|
| 0 | 2way SERVER | xxxxxxa | ON LOAN | 0 | 0 | 0 | 0 | 0 |
| 1 | 2way SERVER | xxxxxxy | EMPTY | 0 | 1 | 1 | 1 | 1 |
| 2 | 2way SERVER | xxxxxxc | ON LOAN | 0 | 2 | 2 | 2 | 2 |
| ... | ... | ... | ... | ... | ... | ... | ... | ... |
| 10 | 2way SERVER | xxxxxxf | EMPTY | 0 | 10 | 10 | 10 | 10 |
| 11 | 2way SERVER | xxxxxxg | ON LOAN | 0 | 11 | 11 | 11 | 11 |
| ... | ... | ... | ... | ... | ... | ... | ... | ... |
| 31 | 2way SERVER | xxxxxxk | ON LOAN | 0 | 31 | 0 | 31 | 31 |
| ... | ... | ... | ... | ... | ... | ... | ... | ... |
| 63 (36+27) | 2way SERVER | xxxxxxm | ON LOAN | 1 | 27 | 1 | 27 | 63 (36+27) |
| ... | ... | ... | ... | ... | ... | ... | ... | ... |
| 36n+m | 2way SERVER | xxxxxxp | EMPTY | n | m | n | m | 36n+m |

FIG. 15

| DISK | DISK UNIQUE ADDRESS | MODEL | CONNECTION PSV | ALLOCATION LP | ALLOCATION LSV | LDISK |
|---|---|---|---|---|---|---|
| 0 | 5000c50054bae5d9 | SSD 120GB | 0 | 2 | 1 | -1 |
| 1 | 5000c50054baf145 | SSD 120GB | -1 | -1 | -1 | -1 |
| 2 | 500e004aaa02001b | SSD 120GB | -1 | 2 | 2 | -1 |
| .. | .. | .. | .. | .. | .. | .. |
| 10 | 500e004aaa0600d6 | SSD 120GB | 63 | 1 | 0 | 1 |
| 11 | 5000c50054baf411 | SSD 120GB | -1 | -1 | -1 | -1 |
| 12 | 5000c50054baf412 | SSD 120GB | 2 | 1 | 1 | 2 |
| .. | .. | .. | .. | .. | .. | .. |
| 62 | 5000c50054baf522 | SSD 120GB | 11 | 2 | 3 | -1 |
| 63 | 500e004aaa0200f2 | | -1 | -1 | -1 | -1 |
| 64 | 5000c50054aaf405 | SSD 120GB | 2 | 1 | 1 | 3 |
| 65 | 5000c50054aaf407 | HDD 500GB | 0 | 2 | 1 | 2 |
| .. | .. | .. | .. | .. | .. | .. |
| 126 | 5000c50054baaa13 | HDD 500GB | 2 | 1 | 1 | 4 |
| 127 | 5000c50054baaa15 | HDD 500GB | 31 | 2 | 0 | 1 |
| .. | .. | .. | .. | .. | .. | .. |

DSKDB

FIG. 16

LSVDB

| LPID | LSVID | OS TYPE | ALLOCATION PSV | DISK LIST | LSTRG NAME LIST |
|---|---|---|---|---|---|
| 1 | 0 | OS-A-a | -1 | 10 | None |
| 1 | 1 | OS-A-b | 2 | 12,64,126 | None |
| 2 | 0 | OS-B-a | -1 | 127 | None |
| 2 | 1 | OS-B-a | 0 | 0,65 | None |
| 2 | 2 | OS-B-a | -1 | 2 | None |
| 2 | 3 | OS-B-a | 11 | 62 | None |
| .. | .. | .. | .. | .. | .. |
| 255 | 0 | SGW | 31 | None | iqn.2013-03.net.US1:storagegw<br>iqn.2012-11.net.US2:storagegw |
| 255 | 1 | SGW | 63 | None | |
| 255 | 2 | SGW | -1 | None | |

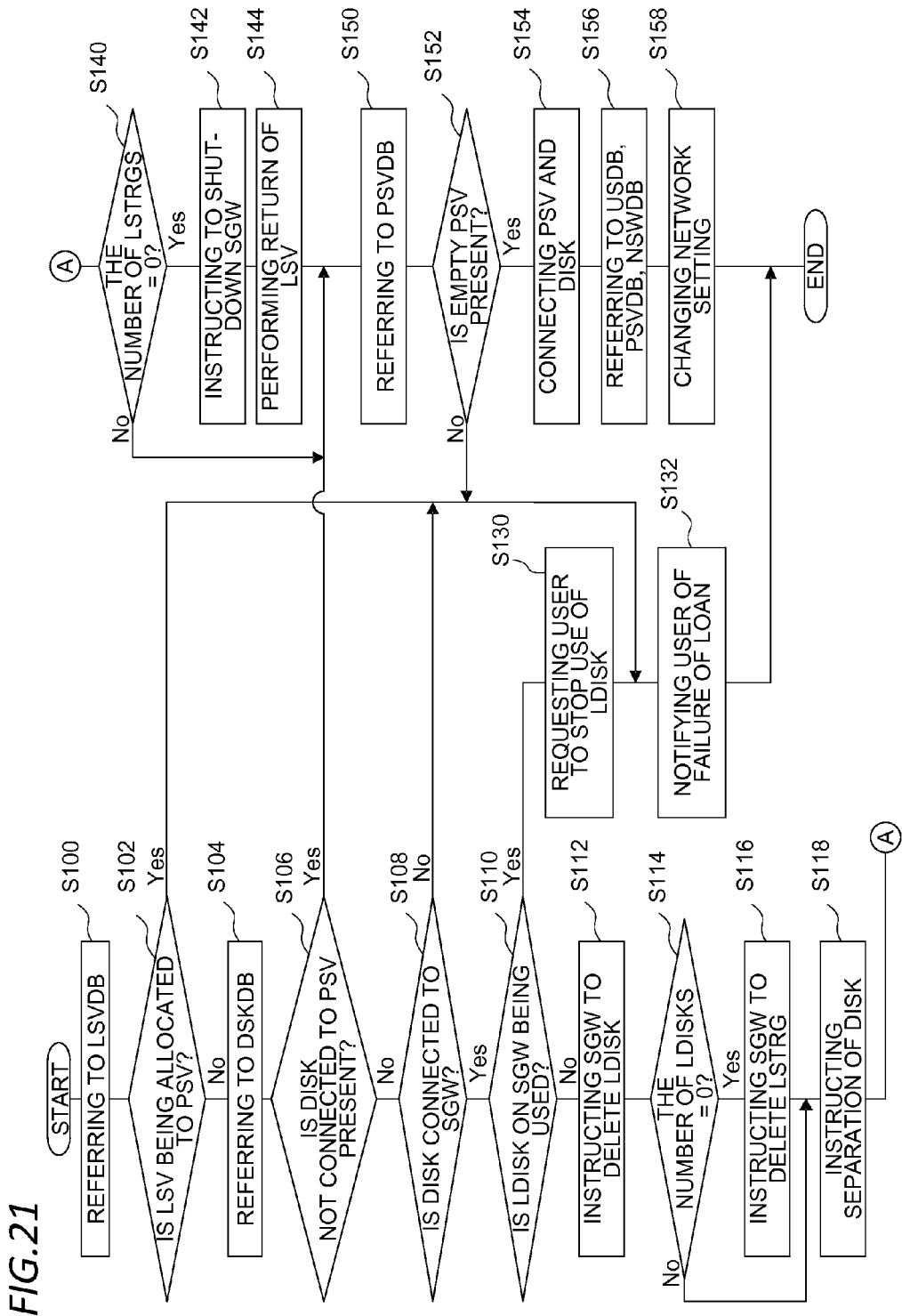

APPARATUS AND METHOD FOR CONTROLLING ACCESS TO A DISK APPARATUS IN AN INFORMATION PROCESSING SYSTEM

CROSS-REFERENCE TO RELATED APPLICATION

This application is based upon and claims the benefit of priority of the prior Japanese Patent Application 2013-117527 filed on Jun. 4, 2013, the entire contents of which are incorporated herein by reference.

FIELD

The embodiments discussed herein are related to apparatus and method for controlling access to a disk apparatus in an information processing system.

BACKGROUND

SIP (Session Initiation Protocol) servers have been distributed interconnecting the IP (Internet Protocol) phones serving as clients. Further, a method for connecting storage devices to a network using a protocol called an Internet Small Computer Systems Interface (iSCSI) is being distributed. For example, a method has been proposed improving the connectibility between a terminal connected to another local address system and an iSCSI storage device by using a protocol conversion apparatus which converts between the SIP and the iSCSI protocol See, for example, Japanese Patent Application Laid-Open No. 2011-257793.

When a server connected to a security ensured network storage through a switch fails, a method for connecting another server to the storage has been suggested by switching the switch to take over an existing security settings. See, for example, Japanese Patent Application Laid-Open No. 2007-164394.

SUMMARY

According to an aspect of the embodiments, an information processing system includes an information processing apparatus and a management apparatus. The information processing apparatus includes a plurality of operation processing apparatuses, a plurality of disk apparatuses, and a switch apparatus which connects any one of the plurality of operation processing apparatuses to any one of the plurality of disk apparatuses. The management apparatus is configured to provide a first operation resource and a first storage resource of a first processing apparatus, in which a first operation processing apparatus among the plurality of operation processing apparatuses and a first disk apparatus among the plurality of disk apparatuses are connected with each other through the switch apparatus, to a terminal apparatus through a network, in response to a loan request from the terminal apparatus connected to the plurality of operation processing apparatuses through the network, and release the connection between the first operation processing apparatus and the first disk apparatus through the switch apparatus in response to a return request from the terminal apparatus and provide the first storage resource and a second operation resource of a second processing apparatus, in which a second operation processing apparatus among the plurality of operation processing apparatuses and the first disk apparatus are connected with each other through the switch apparatus, to the terminal apparatus through the network.

According to another aspect of the embodiments, a management apparatus manages an information processing apparatus including a plurality of operation processing apparatuses, a plurality of disk apparatuses, and a switch apparatus which connects any one of the plurality of operation processing apparatuses to any one of the plurality of disk apparatuses. The management apparatus provide a first operation resource and a first storage resource of a first processing apparatus, in which a first operation processing apparatus among the plurality of operation processing apparatuses and a first disk apparatus among the plurality of disk apparatuses are connected with each other through the switch apparatus, to a terminal apparatus through a network, in response to a loan request from the terminal apparatus connected to the plurality of operation processing apparatuses through the network. The management apparatus releases the connection between the first operation processing apparatus and the first disk apparatus through the switch apparatus, in response to a return request from the terminal apparatus and provide the first storage resource and a second operation resource of a second processing apparatus, in which a second operation processing apparatus among the plurality of operation processing apparatuses and the first disk apparatus are connected with each other through the switch apparatus, to the terminal apparatus through the network.

According to yet another aspect of the embodiments, a control method of an information processing system is provided, which includes an information processing apparatus including a plurality of operation processing apparatuses, a plurality of disk apparatuses, and a switch apparatus which connects any of the plurality of operation processing apparatuses to any of the plurality of disk apparatuses, and a management apparatus managing the information processing apparatus. The control method includes: providing, by the management apparatus, a first operation resource and a first storage resource of a first processing apparatus, in which a first operation processing apparatus among the plurality of operation processing apparatuses and a first disk apparatus among the plurality of disk apparatuses are connected with each other through the switch apparatus, to the terminal apparatus through a network, in response to a loan request from the terminal apparatus connected to the plurality of operation processing apparatuses through the network; releasing, by the management apparatus, the connection between the first operation processing apparatus and the first disk apparatus through the switch apparatus, in response to a return request from the terminal apparatus; and providing, by the management apparatus, the first storage resource and a second operation resource of the second processing apparatus, in which the second operation processing apparatus among the plurality of operation processing apparatuses and the first disk apparatus are connected with each other through the switch apparatus, to the terminal apparatus through the network.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

The information processing system, the management apparatus, and the control method of the information processing system, which are disclosed in the present specification, may access the disk apparatus during the return of the operation processing apparatus.

BRIEF DESCRIPTION OF DRAWINGS

FIG. 7 is a diagram illustrating an example of a database USDB illustrated in FIG. 6, according to an embodiment.

FIG. 8 is a diagram illustrating an example of a database PSVDB in the connection state illustrated in FIG. 4, according to an embodiment.

FIG. 9 is a diagram illustrating an example of a database DSKDB in the connection state illustrated in FIG. 4, according to an embodiment.

FIG. 10 is a diagram illustrating an example of a database LSVDB in the connection state illustrated in FIG. 4, according to an embodiment.

FIG. 11 is a diagram illustrating an example of a database NSWDB illustrated in FIG. 6, according to an embodiment.

FIG. 14 is a diagram illustrating an example of a database PSVDB in the connection state illustrated in FIG. 13, according to an embodiment.

FIG. 15 is a diagram illustrating an example of a database DSKDB in the connection state illustrated in FIG. 13, according to an embodiment.

FIG. 16 is a diagram illustrating an example of a database LSVDB in the connection state illustrated in FIG. 13, according to an embodiment.

FIG. 21 is a diagram illustrating an example of an operational flowchart for a loan process of a server using a plurality of storage gateways in an information processing system illustrated in FIG. 3, according to an embodiment.

DESCRIPTION OF EMBODIMENTS

In the information processing system having a plurality of servers shared by multiple users in time division, it is difficult to refer to data stored in a disk apparatus connected to the server during a period of time from the server is returned until the server is loaned again.

Hereinafter, embodiments will be described with reference to the accompanying drawings.

Figure 1:
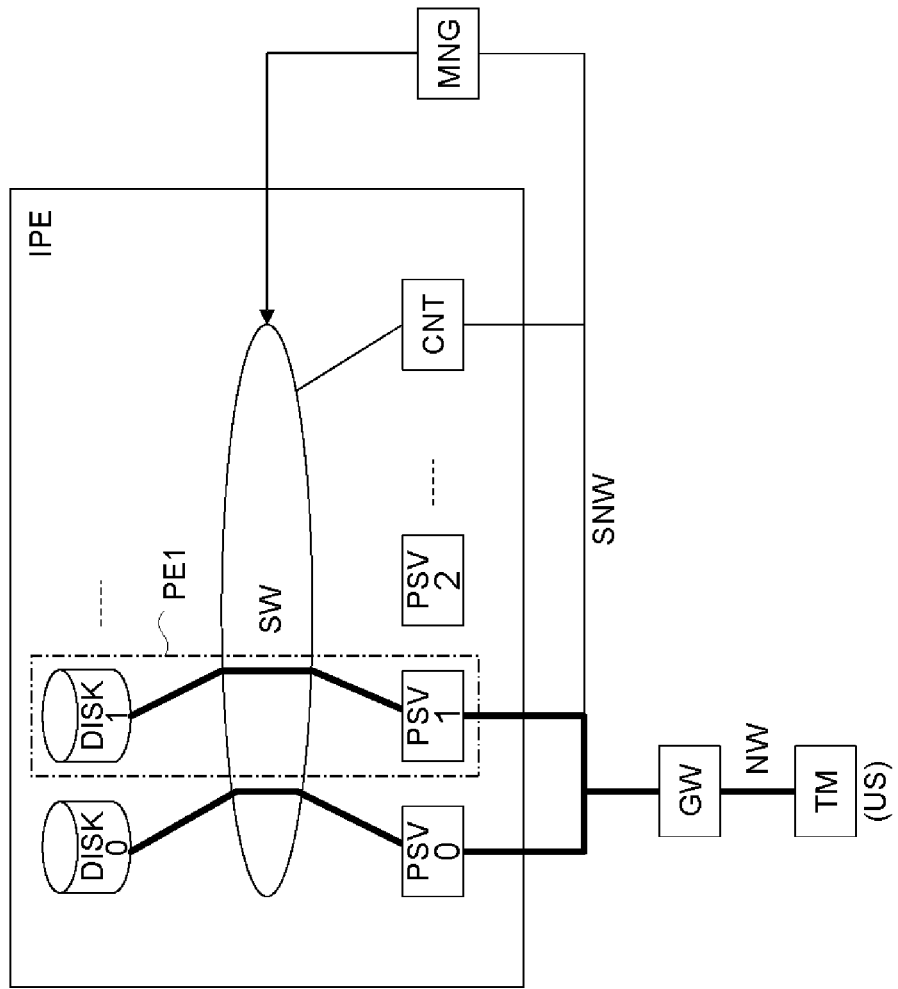
FIG. 1 is a diagram illustrating an example of an information processing system, according to an embodiment.

FIG. 1 is a diagram illustrating an example of an information processing system, according to an embodiment. In FIG. 1, an information processing system SYS1 includes an information processing apparatus IPE and a management apparatus MNG. The information processing apparatus IPE includes a plurality of operation processing apparatuses PSV (PSV0, PSV1, . . . ), a plurality of disk apparatuses DISK (DISK0, DISK1, . . . ), a switch apparatus SW which connects the operation processing apparatuses PSVs to the disk apparatuses DISKs, and a control apparatus CNT. For example, the operation processing apparatus PSV is a server and the disk apparatus DISK is a hard disk apparatus or a silicon disk apparatus. Although not especially limited, the information processing system SYS1 may be configured to realize a service referred to as a physical IaaS providing a physical server, not a virtual machine, among, for example, Infrastructure as Service (IaaS).

The management apparatus MNG connects, for example, an empty operation processing apparatus PSV1 to an empty disk apparatus DISK1 through the switch apparatus SW, in response to a loan request from a terminal apparatus TM which is connected to the operation processing apparatus PSV through a network SNW. A processing apparatus PE1 which is loaned to the terminal apparatus TM is built by the connection between the operation processing apparatus PSV1 with the disk apparatus DISK1. Further, the management apparatus MNG provides, via the built processing apparatus PE1, an operation resource of the operation processing apparatus PSV1 and a storage resource of the disk apparatus DISK1 to the terminal apparatus TM through the network SNW. The bold line in FIG. 1 indicates a state in which the management apparatus MNG has loaned an operation processing apparatus PSV0 and a disk apparatus DISK0 as a processing apparatus PE0 to the terminal apparatus TM and loaned the operation processing apparatus PSV1 and the disk apparatus DISK1 as the processing apparatus PE1 to the terminal apparatus TM. For example, the terminal apparatus TM is connected to the network SNW through a network NW and a gateway GW, and operated by a user US who borrows the processing apparatuses PE0 and PE1.

Figure 2:
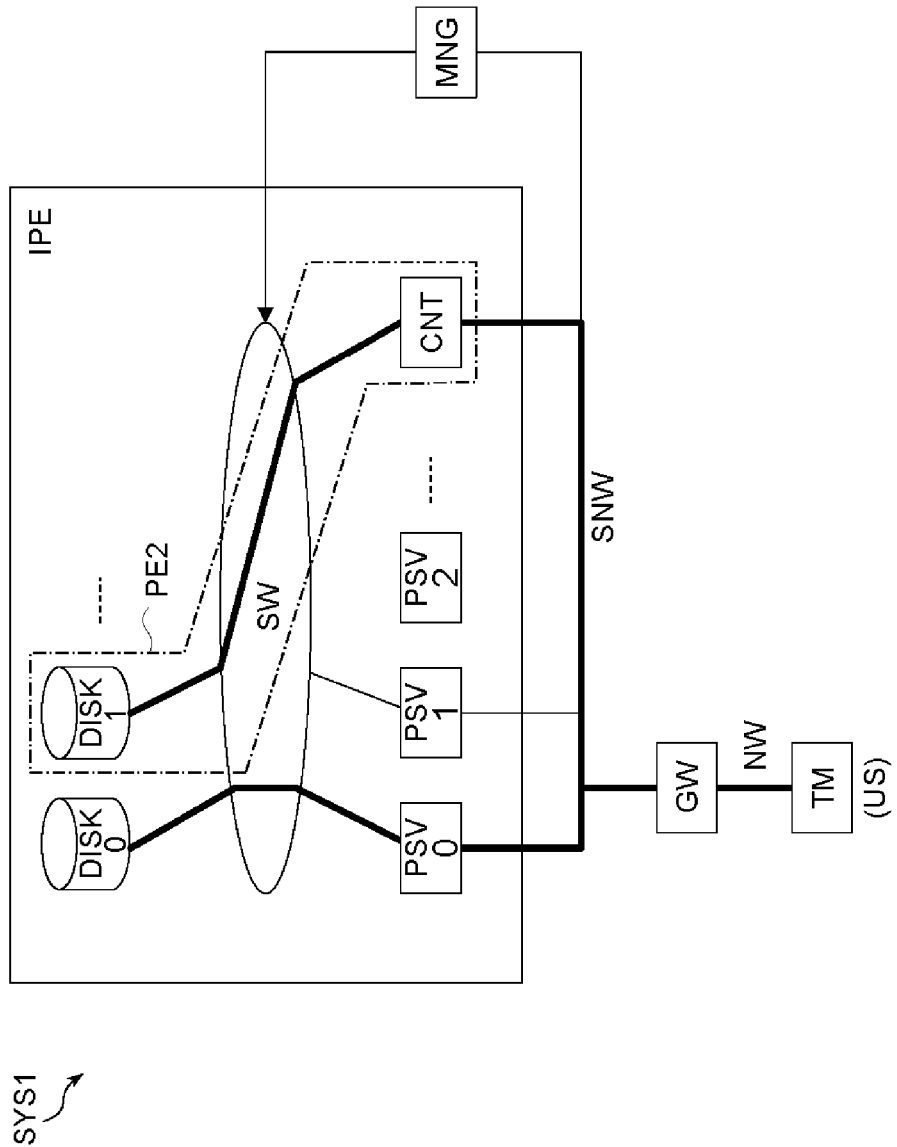
FIG. 2 is a diagram illustrating an example of a connection pattern within the information processing system illustrated in FIG. 1, according to an embodiment.

As illustrated in FIG. 2, the control apparatus CNT serves to provide the disk apparatus DISK1 loaned as the processing apparatus PE1 to the terminal apparatus TM in the state in which the processing apparatus PE1 (FIG. 1) loaned to the terminal apparatus TM has been returned. The control apparatus CNT is an example of the operation processing apparatus. Meanwhile, the control apparatus CNT may be configured using any one of the operation processing apparatuses PSVs within the information processing apparatus IPE. In this case, the management apparatus MNG may manage the control apparatus CNT in the same way as the operation processing apparatus PSV and thus may easily manage the information processing system SYS1.

FIG. 2 is a diagram illustrating an example of a connection pattern within an information processing system illustrated in FIG. 1, according to an embodiment. In the state illustrated in FIG. 1, upon receiving the return request for the processing apparatus PE1 from the terminal apparatus TM, the management apparatus MNG releases, based on the return request, the connection between the operation processing apparatus PSV1 and the disk apparatus DISK1 through the switch apparatus SW, and thus stops the provision of the processing apparatus PE1 to the terminal apparatus TM. Therefore, the loan of the operation resource of the operation processing apparatus PSV1 and the storage resource of the disk apparatus DISK1, via the processing apparatus PE1, to the terminal apparatus TM is stopped.

After the loan of the operation processing apparatus PSV1 to the terminal apparatus TM is stopped, the management apparatus MNG connects the control apparatus CNT and the disk apparatus DISK1 through the switch apparatus SW to build a processing apparatus PE2. Further, the management apparatus MNG provides the operation resource of the control apparatus CNT of and the storage resource of the disk apparatus DISK1, via the built processing apparatus PE2, to the terminal apparatus TM through the network SNW. Therefore, the terminal apparatus TM may access the disk apparatus DISK1 using the operation resource of the control apparatus CNT after returning the processing apparatus PE1.

For example, the storage resource of the disk apparatus DISK 1 may become accessible by another operation processing apparatus PSV0 through the network NW by the control of the operation resource of the control apparatus CNT. In FIG. 2, the bold line in the processing apparatus PE2 indicates a state in which the storage resource of the disk apparatus DISK1 within the processing apparatus PE1 (FIG. 1) returned from the terminal apparatus TM in FIG. 1 is provided to the terminal apparatus TM without using the operation resource of the operation processing apparatus PSV1.

In the state illustrated in FIG. 2, when again receiving the loan request for the processing apparatus PE1, which is being returned, from the terminal apparatus TM, the management apparatus MNG releases the connection between the control apparatus CNT and the disk apparatus DISK1 through the switch apparatus SW. Therefore, the provision of the storage resource of the disk apparatus DISK1 to the terminal apparatus TM via the processing apparatus PE2 is stopped. Next, the management apparatus MNG connects the operation processing apparatus PSV1 and the disk apparatus DISK1 through the switch apparatus SW to build the processing apparatus PE1 as illustrated in FIG. 1. Further, the management apparatus MNG provides an operation resource of the operation processing apparatus PSV1 and a storage resource of the disk apparatus DISK1, via the built processing apparatus PE1, to the terminal apparatus TM through the network SNW. That is, the connection within the information processing system SYS1 returns to the state illustrated in FIG. 1.

Meanwhile, when the loan request for the processing apparatus PE1 being returned is issued from the terminal apparatus TM, there may be a case in which the operation processing apparatus PSV1 is being loaned to another terminal apparatus TM. In this case, the management apparatus MNG connects another empty operation processing apparatus PSV (for example, PSV2) and the disk apparatus DISK1 through the switch apparatus SW to build the processing apparatus PE1 illustrated in FIG. 1. Therefore, the terminal apparatus TM may execute the data processing and the like by using the environment of the processing apparatus PE1 that is similar to that before the processing apparatus PE1 was returned. Further, for example, even when the information stored in the disk apparatus DISK1 is updated in a state of the processing apparatus PE1 being returned, the operation processing apparatus PSV newly operated as the processing apparatus PE1 may refer to updated information of the disk apparatus DISK1. That is, the reliability of the information stored in the disk apparatus DISK1 may be secured.

For example, the control apparatus CNT may be configured to serve as a storage gateway, and to provide the disk apparatus DISK1, as the iSCSI target by using the iSCSI protocol, to the operation processing apparatus PSV and the terminal apparatus TM on the network SNW.

As described above, in the embodiment illustrated in FIGS. 1 and 2, after returning the processing apparatus PE1, the terminal apparatus TM may access the disk apparatus DISK1 without using the operation processing apparatus PSV1. That is, after returning the processing apparatus PE1, the terminal apparatus TM may access the information that was recorded in the disk apparatus DISK1 during a time period when the processing apparatus PE1 was loaned. Further, the terminal apparatus TM may receive the loan of the processing apparatus PE1 again and then refer to, for example, the data which was updated and stored in the disk apparatus DISK1 during a time period when the processing apparatus PE1 was being returned.

For example, there may be a case in which the processing apparatus PE1 is returned from the terminal apparatus TM and then all the operation processing apparatuses PSVs within the information processing apparatus IPE are loaned to a plurality of other terminal apparatuses TMs as the processing apparatus PE along with the disk apparatus DISK. In this case, even though the loan request is issued from the terminal apparatus TM, the terminal apparatus TM fails to receive the loan of the processing apparatus PE1. However, the terminal apparatus TM may access the disk apparatus DISK 1 through the processing apparatus PE2 which is built by the control apparatus CNT. In other words, in the physical IaaS using the processing apparatus PE1 on demand, the terminal apparatus TM (user US) may access the data that was used in the processing apparatus PE1 even when the previously loaned processing apparatus PE1 is being returned.

FIGS. 3 to 21 are diagrams illustrating an information processing system, a management apparatus, and a control method of the information processing system, according to an embodiment. Elements, which are the same as or similar to the elements described in the embodiments illustrated in FIGS. 1 and 2, are denoted by the same reference numerals and the detailed description thereof will be omitted here.

Figure 3:
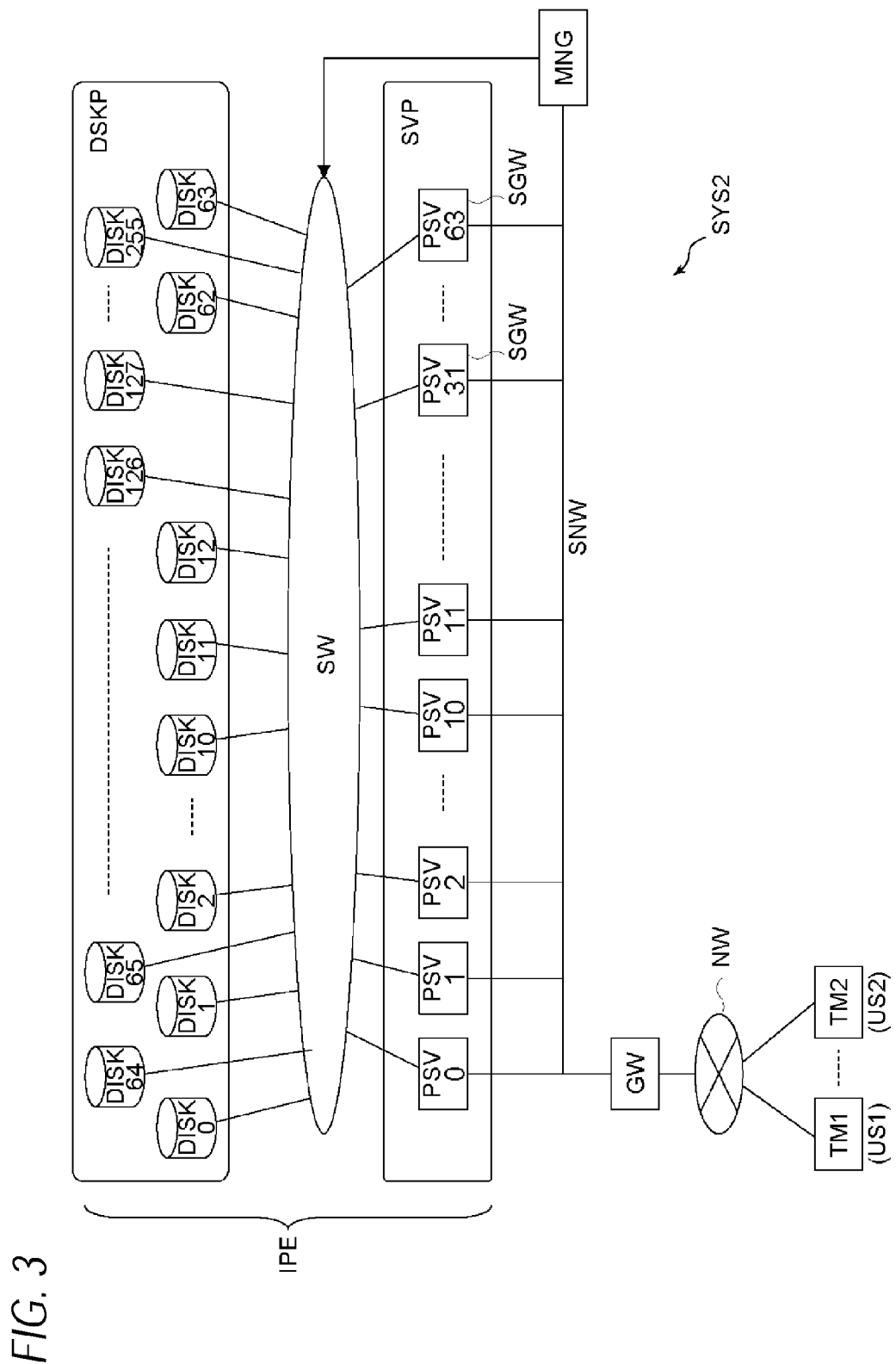
FIG. 3 is a diagram illustrating an example of an information processing system, a management apparatus, and a control method of the information processing system, according to an embodiment.

In FIG. 3, an information processing system SYS2 includes a server pool SVP, a disk pool DSKP, the switch apparatus SW, and the management apparatus MNG. The server pool SVP, the disk pool DSKP, and the switch apparatus SW serve as the information processing apparatus IPE, which independently executes data processing from each other, in response to requests from the terminal apparatuses TMs (TM1 and TM2) corresponding to multiple users USs (US1 and US2). Although not especially limited, the information processing system SYS2 may be configured to realize a service called a physical IaaS, providing a physical server, not a virtual machine, for example, among types of IaaS.

The server pool SVP has a plurality of servers PSVs. For example, each server PSV includes a central processing unit (CPU) and a memory (e.g., a main storage such as a memory module), and is an example of the operation processing apparatus. The disk pool DSKP has a plurality of disk apparatuses DISKs. Meanwhile, instead of the CPU, each server PSV may have a processor such as a digital signal processor (DSP) and a graphics processing unit (GPU) which are operated by executing programs.

For example, the disk apparatus DISK may be a hard disk drive (HDD) and a silicon disk apparatus such as a solid state drive (SSD). Numerals attached to the end of labels (PSVs and DISKs) denoting the server PSV and the disk apparatus DISK indicate numbers identifying the server PSV and the disk apparatus DISK, respectively. In the following description, the numbers identifying the server PSV and the disk apparatus DISK are called identification (ID). Meanwhile, the number of servers PSVs to be accommodated in the server pool SVP is not limited to 64 and the number of disk apparatuses DISKs to be accommodated in the disk pool DSKP may not be limited to 256.

The switch apparatus SW has ports respectively connected to the servers PSV and ports respectively connected to the disk apparatuses DISKs. The switch apparatus SW connects a server PSV to a predetermined disk apparatus DISK or blocks a connection between a server PSV and a disk apparatus DISK, under the control of the management apparatus MNG.

The server PSV and the management apparatus MNG are connected to the network SNW. For example, the network SNW is connected to the terminal apparatuses TMs (e.g., TM1 and TM2) that are used respectively by the users USs (e.g., US1 and US2) of the information processing system SYS2 through the gateway GW and the network NW. The number of users USs and the number of terminal apparatuses TMs may not be limited to two (2). The user US carries out or breaks a contract for using the information processing system SYS2 by inputting predetermined information to the terminal apparatuses TMs, and carries out loan or return of the server PSV and the disk apparatus DISK during the contract period.

A predetermined number of servers PSVs (e.g., three including PSV31 and PSV63) may not be loaned to the user US but operated as the storage gateway SGW under the control of the management apparatus MNG. For example, a server PSV operated as the storage gateway SGW and a server PSV loaned to the user US are differentiated in advance. When the management apparatus MNG receives the return requests of the server PSV and the disk apparatus DISK from the terminal apparatus TM, the storage gateway SGW allows the terminal apparatus TM to access the returned disk apparatus DISK as the network disk.

Figure 4:
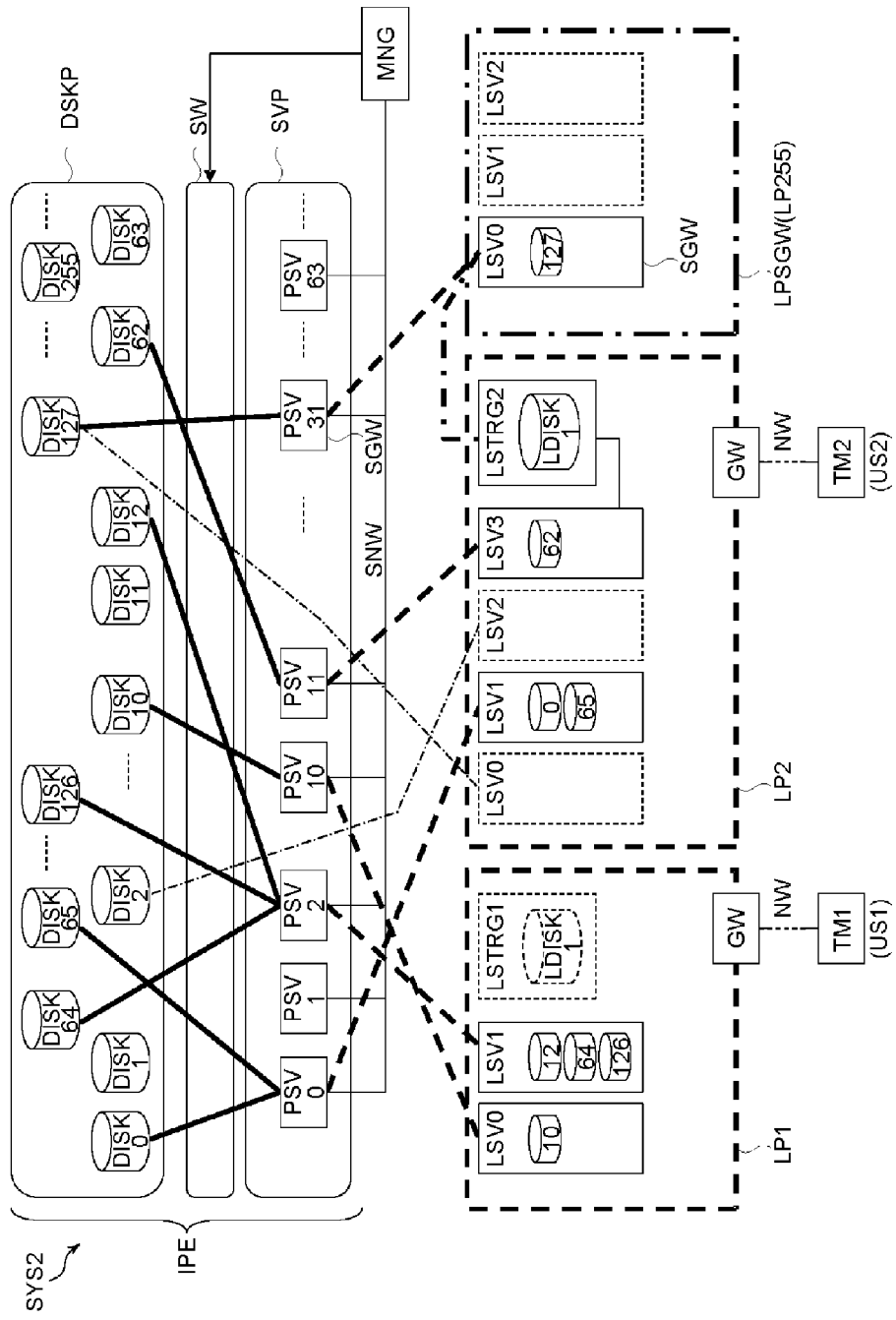
FIG. 4 is a diagram illustrating an example of a connection pattern within the information processing system illustrated in FIG. 3, according to an embodiment.

FIG. 4 is a diagram illustrating an example of a connection pattern within the information processing system SYS2 illustrated in FIG. 3, according to an embodiment. In FIG. 4, the bold sold line indicates a connection between the server PSV and the disk apparatus DISK which are connected to each other through the switch apparatus SW. The server PSV and the disk apparatuses DISKs connected with each other by the bold solid line through the switch apparatus SW are an example of the processing apparatus loaned to the user US (terminal apparatus TM). A rectangular frame illustrated by the bold broken line illustrates an example of a logical configuration of the information processing system SYS2 which is viewed from the user US (terminal apparatus TM). Hereinafter, the logical configuration of the information processing system SYS2 which is viewed from the user US (terminal apparatus TM) is called a logical platform LP. The numeral attached to the end of a label LP denoting a logical platform LP indicates a number ID identifying the logical platform LP, and is the same as the number assigned to the user US.

The rectangular frame depicted by the bold dashed line illustrates an example of a logical platform LPSGW which includes a logical server LSV operated as the storage gateway SGW. For example, the management apparatus MNG allocates the logical platform LPSGW to a logical platform LP255 and sets the ID of the logical platform LPSGW at "255".

The bold broken line shows a correspondence relationship between the logical server LSV, which is defined within the logical platforms LP and LPSGW, and the server PSV. In the following description, the server PSV is called as the physical server PSV. For example, the logical server LSV within the logical platforms LP and LPSGW is a processor which performs data processing, a memory, and a disk apparatus.

In each logical platform LP, the logical server LSV (e.g., the rectangular frame illustrated by the solid line) which is connected by the bold broken line represents a logical server which is loaned by a request from the user US and thus is in a loaned state. The logical server LSV, which is illustrated by the solid-line rectangular frame within the logical platform LP, and built by the server PSV and the disk apparatus DISK which are connected to each other by the bold solid line, represents a processing apparatus, and thus is being loaned to the terminal apparatus TM. In other words, the logical server LSV which is illustrated by the solid-line rectangular frame represents an operation resource of the processing apparatus. The disk apparatus listed in the logical server LSV, which is illustrated by the solid-line rectangular frame, represents a storage resource of the processing apparatus, and the numerals attached to the disk apparatus within the logical server LSV represent the numbers of the disk apparatuses DISKs which are being loaned among the disk apparatuses within the disk pool DSKP.

In each logical platform LP, the logical server LSV which is illustrated by the broken-line rectangular frame represents a processing apparatus which is returned by the request from the user US and thus is in the returned state. The processing apparatus being in the returned state is not made associated with the server PSV (not connected by the solid broken line). In a logical platform LP2, a thin dashed line which connects the logical server LSV to the disk apparatus DISK points to the disk apparatus DISK which was accessible by the logical server LSV before the logical server LSV is returned from the user US2.

The bold dashed line represents that the disk apparatus DISK which was accessible by the logical server LSV returned by the user US is made accessible through the storage gateway SGW. For example, the use of the disk apparatus DISK as a logical disk LDISK is registered in advance, such that the disk apparatus DISK may be accessed from the terminal apparatus TM through the storage gateway SGW even after the user US has returned the logical server LSV.

The disk apparatus DISK returned from the user US is a logical disk LDISK (LDISK1) within a logical storage apparatus LSTRG (LSTRG2) and may be accessed by another logical server LSV (LSV3) which is being loaned. It is illustrated that a logical storage apparatus LSTRG1 illustrated by the broken-line frame does not include the mounted logical disk LDISK and is deleted from the logical platform LP1.

In the logical platform LPSGW, it is illustrated that the logical server LSV (solid-line rectangular frame) connected by the bold broken line is being operated as the storage gateway SGW. For example, the storage gateway SGW (logical server LSV0) which is depicted by the solid-line rectangular frame represents a processing apparatus which is built by a server PSV31 and a disk apparatus DISK127 which are connected to each other by the bold solid line. In other words, the storage gateway SGW which is depicted by the solid-line rectangular frame represents an operation resource of the processing apparatus. The disk apparatus listed in the storage gateway SGW which is depicted by the solid-line rectangular frame represents a storage resource of the processing apparatus, and numerals attached to the disk apparatus within the logical server LSV represents a number of the disk apparatus DISK which is being returned among disk apparatuses within the disk pool DSKP.

In the logical platform LPSGW, it is illustrated that the logical server LSV depicted by the broken-line rectangular frame is not being operated as the storage gateway SGW. For example, the physical server PSV corresponding to the storage gateway SGW, which is not being operated, is shut-down and thus does not consume power.

In the example illustrated in FIG. 4, the terminal apparatus TM1 of the user US1 is connected to the information processing system SYS2 through the logical servers LSV0 and LSV1 which are defined in the logical platform LP1. For example, the logical server LSV0 represents a processing apparatus which is built by a physical server PSV10 and a disk apparatus DISK10 which are connected to each other through the switch apparatus SW. The logical server LSV1 represents a processing apparatus which is built by the physical server PSV2 and disk apparatuses DISK12, DISK64, and DISK126 which are connected to each other through the switch apparatus SW.

The terminal apparatus TM2 of the user US2 is connected to the information processing system SYS2 through the logical servers LSV1 and LSV3 which are defined in the logical platform LP2. For example, the logical server LSV1 represents a processing apparatus which is built by the physical server PSV0 and disk apparatuses DISK0 and DISK65 which are connected to each other through the switch apparatus SW. The logical server LSV3 represents a processing apparatus which is built by a physical server PSV11 and a disk apparatus DISK62 which are connected to each other through the switch apparatus SW.

The logical servers LSV0 and LSV2 which are defined in the logical platform LP2 are being returned by the user US2. During the loan period of the logical server LSV0, the disk apparatus DISK127 which is defined as the storage resource of the logical server LSV0 may be accessed as the logical disk LDISK1 mounted in the logical storage apparatus LSTRG2. For example, the logical disk LDISK1 which is mounted in the logical storage apparatus LSTRG2 may be accessed by the logical server LSV3 which is being loaned. For example, the disk apparatus DISK2 that was accessed from the logical server LSV2 during the loan period of the logical server LSV2, is not connected to the storage gateway SGW since the use as the logical disk LDISK is not registered.

The server LSV0 which is defined in the logical platform LPSGW operated as the storage gateway SGW provides the disk apparatus DISK127 on the logical platform LP2 as the logical disk LDISK1. For example, the logical storage apparatus LSTRG is allocated into the logical platform LP as the iSCSI target by using the iSCSI protocol. The logical disk LDISK is allocated with a logical unit number (LUN) within the iSCSI target and is identified by the LUN.

Figure 5:
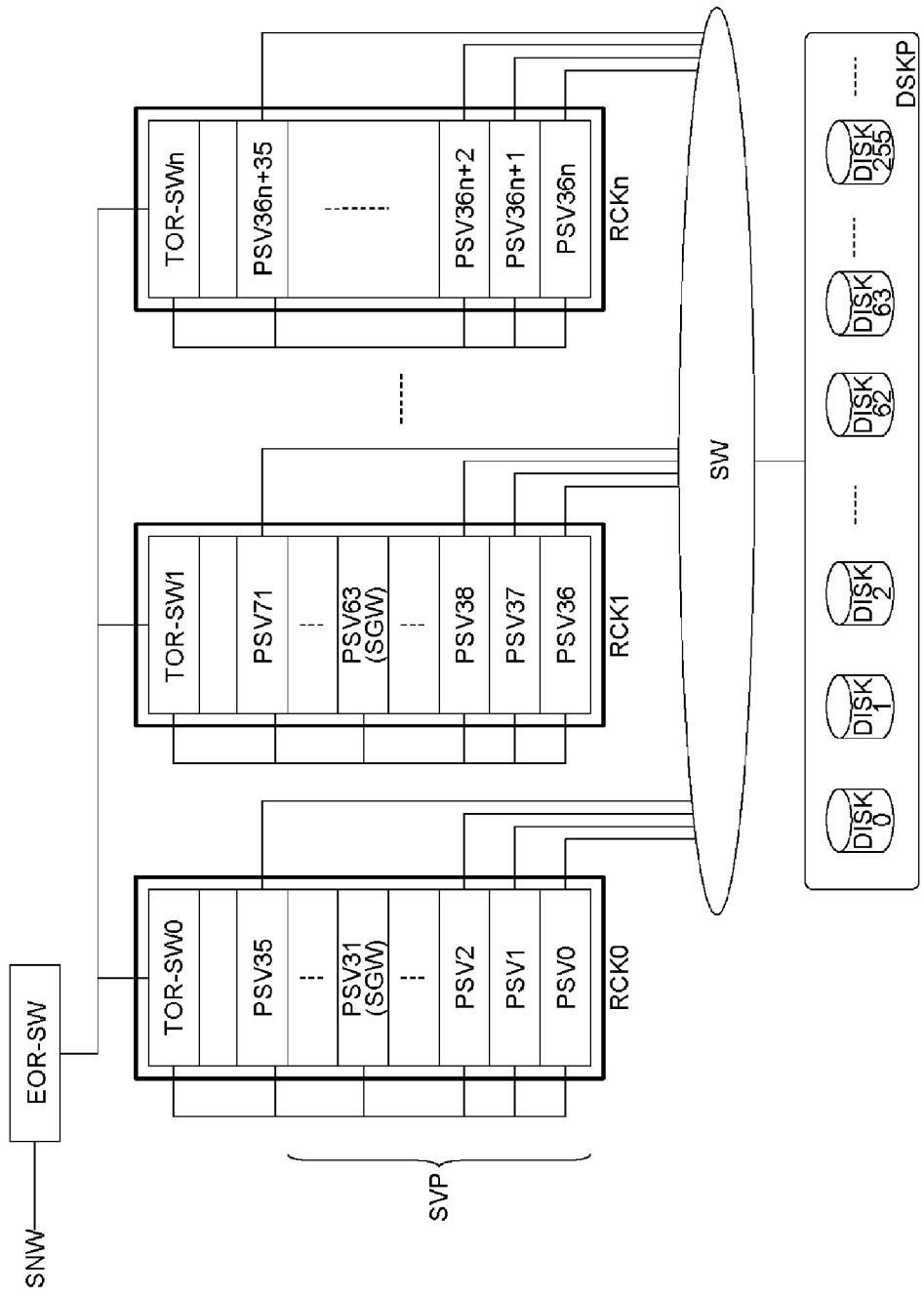
FIG. 5 is a diagram illustrating an example of a disposition of a server within a server pool illustrated in FIG. 3, according to an embodiment.

FIG. 5 is a diagram illustrating an example of a disposition of a server PSV within the server pool SVP illustrated in FIG. 3, according to an embodiment. For example, the server PSV is installed in n+1 (n is a positive integer) racks RCKs (RCK0, RCK1, . . . , RCKn). For example, when there are 36 slots, each accommodating a server, in each rack RCK, 36n+35 servers PSVs may be installed in the n+1 racks RCKs. As illustrated in FIG. 3, each server PSV is connected to each of the ports of the switch apparatus SW.

Each rack RCK is installed with a switch (Top of Rack (TOR)-SW) (TOR-SW0, TOR-SW1, . . . , TOR-SWn) which is connected to the servers PSVs within the rack RCK. Each switch TOR-SW is connected to the network SNW through a switch (End of Rack (EOR)-SW).

When the physical server PSV is allocated as the logical server LSV of the logical platform LP, the switch TOR-SW changes the setting of the network SNW of VLAN, and the like based on the instruction from a network control unit NWCNT (FIG. 6) of the management apparatus MNG.

When the network SNW is the VLAN, the VLAN setting between the physical server PSV, which is loaned to the user US, and the switch TOR-SW is set in a port VLAN. Further, the switch TOR-SW communicates with the server PSV by using a packet without a tag.

Meanwhile, the VLAN setting between the physical server PSV which is operated as the storage gateway SGW and the switch TOR-SW is set in a tag VLAN. Further, the switch TOR-SW communicates with the server PSV by using a packet (for example, tag VLAN) with a tag. The switch TOR-SW communicates with the switch EOR-SW, using the packet with the tag.

Figure 6:
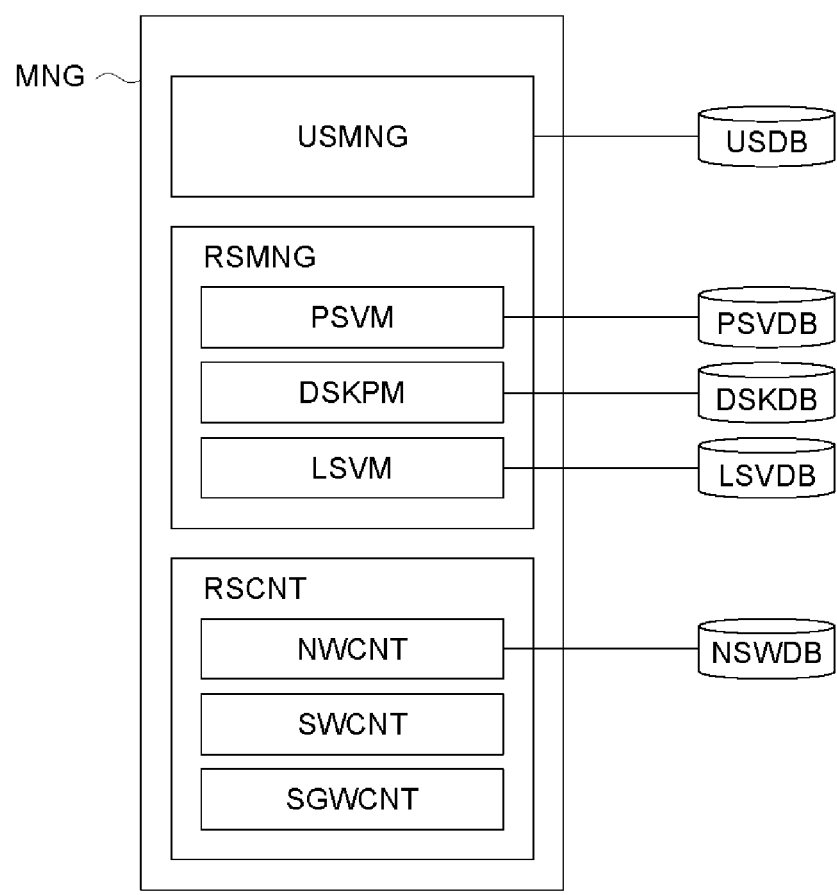
FIG. 6 is a diagram illustrating an example of the management apparatus illustrated in FIG. 3, according to an embodiment.

FIG. 6 is a diagram illustrating an example of a management apparatus MNG illustrated in FIG. 3, according to an embodiment. The management apparatus MNG includes a user management unit USMNG, a resource management unit RSMNG, and a resource control unit RSCNT. For example, the management apparatus MNG may be configured to include a processor, such as a central processing unit (CPU), and a memory, such as a memory module, a hard disk apparatus, and a silicon disk apparatus. The functions of the management apparatus MNG, which will be described later, may be, for example, realized by causing the processor to execute programs stored in the memory by using data stored in the memory.

The user management unit USMNG manages the user US and the logical platform LP defined based on the request from the user US, by using a database USDB. For example, the user management unit USMNG registers the setting information of the logical platform LP in the database USDB, based on the operation of the user US on a portal screen displayed on a display of the terminal apparatus TM. An example of the database USDB is illustrated in FIG. 7.

The resource management unit RSMNG includes a physical server management unit PSVM, a disk pool management unit DSKPM, and a logical server management unit LSVM.

The physical server management unit PSVM manages the physical disposition, and the like of the server PSV that is installed in the rack RCK illustrated in FIG. 5, by using a database PSVDB. Further, the physical server management unit PSVM manages the loan of the server PSV to the user US and the return of the server PSV from the user US by using the database PSVDB. An example of the database PSVDB is illustrated in FIG. 8.

The disk pool management unit DSKPM manages the specifications of the disk apparatus DISK stored in the disk pool DSKP and manages the connection state between each disk apparatus DISK and the server PSV, by using a database DSKDB. An example of the database DSKDB is illustrated in FIG. 9.

The logical server management unit LSVM manages the ID of the logical server LSV defined in the logical platform LP and manages the loan and the return of the logical server LSV defined in the logical platform LP, by using a database LSVDB. For example, the logical server management unit LSVM manages the connection state between the logical server LSV and the server PSV and manages the mapping of the disk apparatus DISK accessed by the logical server LSV. An example of the database LSVDB is illustrated in FIG. 10.

The resource control unit RSCNT includes a network control unit NWCNT, a switch control unit SWCNT, and a storage gateway control unit SGWCNT.

The network control unit NWCNT controls the setting of the switches TOR-SW and EOR-SW on the network SNW, by using a database NSWDB, to allocate the physical server PSV as the logical server LSV on the logical platforms LP and LPSGW. An example of the database NSWDB is illustrated in FIG. 11.

The switch control unit SWCNT controls the connection and the disconnection between disk apparatuses DISKs within the disk pool DSKP and servers PSVs (including a storage gateway SGW) within the server pool SVP.

The storage gateway control unit SGWCNT controls the storage gateway SGW, based on the setting of the logical platform LP by the user US. The storage gateway SGW generates the logical storage apparatus LSTRG on the logical platform LP, based on the control by the storage gateway control unit SGWCNT, to generate the logical disk LDISK within the logical storage apparatus LSTRG. Further, the storage gateway SGW deletes the logical storage disk LDISK within the logical storage apparatus LSTRG, based on the control by the storage gateway control unit SGWCNT, and deletes the logical storage apparatus LSTRG on the logical platform LP.

FIG. 7 is a diagram illustrating an example of the database USDB illustrated in FIG. 6, according to an embodiment. The database USDB has fields for storing user ID, LPID, NWID (LP), IP address range (LP), LSV list, IP address (LSTRG), and LSTRG name, for each user US and each storage gateway SGW. "None" illustrated in the field in which the information on the storage gateway SGW is stored represents a field which is not used.

The user ID indicates an ID of the user US (US1 and US2) that uses the information processing system SYS2 and an ID of the storage gateway SGW. The LPID indicates a number identifying the logical platform LP. The NWID (LP) indicates an ID (network number) identifying a network segment that is obtained by dividing the network SNW in association with the logical platforms LP and SPSGW, for example, an ID of the virtual local area network (VLAN). The logical platforms LP and SPSGW may be identified by the NWID (LP).

The IP address range LP indicates a range of the IP address that is allocatable to the logical platforms LP and LPSGW. The LSV list indicates the numbers of all of the logical servers LSVs which are defined (e.g., contracted) by the user US. The IP address (LSTRG) is an IP address of the logical storage apparatus LSTRG (e.g, iSCSI target) which is generated in the logical platform LP. The logical storage apparatus LSTRG is each generated for each logical platform LP. The LSTRG name is a name (e.g., an iSCSI target name) of the logical storage apparatus LSTRG which is generated in the logical platform LP.

FIG. 8 is a diagram illustrating an example of a database PSVDB in the connection state illustrated in FIG. 4, according to an embodiment. The database PSVDB includes fields for storing a model, a serial number, a state flag, a rack number, a slot number, a TOR number, a TOR port number, and a SW port number, for each physical server PSV.

For example, the model indicates the kind of physical server PSV and the serial number indicates a manufacturing number of the physical server PSV. The state flag indicates whether the physical server PSV is being loaned or empty. For example, the state flag is set at "1" when the physical server PSV is being loaned and is reset at "0" when the physical server PSV is empty.

The rack number indicates a number of the rack RCK in which the physical server PSV is accommodated, and the slot number indicates a slot number within the rack RCK in which the physical server PSV is accommodated. The TOR number indicates a number of a switch TOR-SW number to which the physical server PSV is connected, and the TOR port number indicates a port number of the switch TOR-SW to which the physical server PSV is connected. The SW port number indicates a port number of the switch apparatus SW to which the physical server PSV is connected.

FIG. 9 is a diagram illustrating an example of a database DSKDB in the connection state illustrated in FIG. 4, according to an embodiment. The database DSKDB includes fields for storing a unique address, a model, a connection PSV, an allocation LP, an allocation LSV, and a connection LDISK, for each disk apparatus DISK.

The unique address indicates an address uniquely allocated to each disk apparatus DISK, and the model represents the type and the capacity of the disk apparatus DISK. The connection PSV indicates an ID of the physical server PSV which is connected to the disk apparatus DISK. The number "−1" stored in the field of the connection PSV indicates that the corresponding disk apparatus DISK is not connected to any physical server PSV.

The allocation LP indicates an ID of the logical platform LP which is allocated to the disk apparatus DISK. The number "−1" stored in the region of the allocation LP indicates that the corresponding disk apparatus DISK is not allocated to any logical platform LP. The allocation LSV indicates an ID of the logical server LSV which is allocated to the disk apparatus DISK. The number "−1" stored in the field of the allocation LSV indicates that the corresponding disk apparatus DISK is not allocated to any logical server LSV.

The connection LDISK indicates a number of the logical disk LDISK which is allocated for each logical platform LP in association with each disk apparatus DISK. The number "−1" stored in the field of the connection LDISK indicates that the corresponding disk apparatus DISK is not generated in the logical platform LP as the logical disk LDISK. For example, when the logical storage apparatus LSTRG is connected to the logical platform LP as the iSCSI target, the numerical value stored in the field of the connection LDISK is LUN.

FIG. 10 is a diagram illustrating an example of a database LSVDB in the connection state illustrated in FIG. 4, according to an embodiment. The database LSVDB includes fields for storing a LPID, a LSVID, an OS type, an allocation PSV, a DISK list, and a LSTRG name list.

The LPID indicates the number allocated to the logical platform LP, and the LSVID indicates the number of the logical server LSV which is allocated to each logical platform LP. The OS type indicates the type of operating system which is installed in the logical server LSV, and the allocation PSV indicates the number of physical server PSV which is allocated to each logical server LSV. The number "−1" stored in the region of the allocation PSV indicates that the corresponding logical server LSV is not connected (e.g., being returned) to any physical server PSV.

The DISK list indicates the list of numbers of the disk apparatuses DISKs which are linked to each logical server LSV. The LSTRG name list indicates the list of names of logical storage apparatuses LSTRGs which are being executed by the logical server LSV operated as the storage gateway SGW. In the example illustrated in FIG. 10, the storage gateway SGW corresponding to the logical server LSV of which the number is zero (0) is allocating the logical storage apparatus LSTRG which is defined within the logical platforms LP1 and LP2 (e.g., users US1 and US2).

Meanwhile, in this example, since the logical storage apparatus LSTRG is allocated using the plurality of storage gateways SGWs, the LSTRG name list is added to the database LSVDB. To the contrary, when the logical storage apparatus LSTRG is implemented using one storage gateway SGW, the database LSVDB does not have a field of the LSTRG name list. "None" represented in the field in which the DISK list and the LSTRG name list are stored indicates a non-used field.

FIG. 11 is a diagram illustrating an example of a database NSWDB illustrated in FIG. 6, according to an embodiment. The database NSWDB includes fields for storing a switch ID, a switch type, a rack number, and an IP address, for each switch connected to the network SNW.

The switch ID indicates the number for identifying each switch, the switch type indicates a differentiation between switches TOR-SW and EOR-SW, and the rack number indicates the number of the rack RCK in which the switch TOR-SW is installed. "None" depicted in the field in which the rack number is to be stored indicates that the rack number is not present. The IP address is used for management and used when the management apparatus MNG accesses the switches TOR-SW and EOR-SW.

Figure 12:
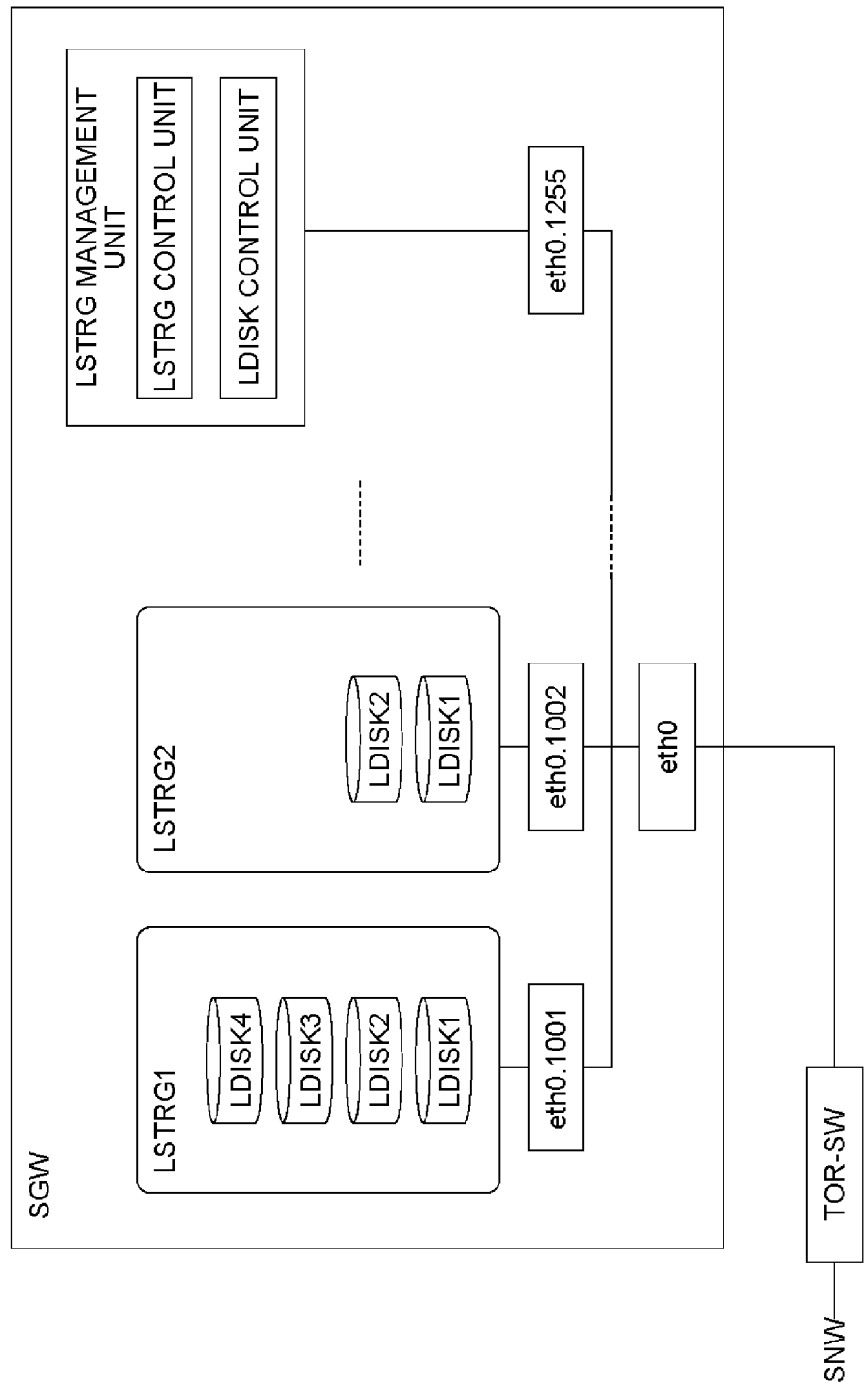
FIG. 12 is a diagram illustrating an example of a storage gateway illustrated in FIG. 4, according to an embodiment.

FIG. 12 is a diagram illustrating an example of a storage gateway SGW illustrated in FIG. 4, according to an embodiment. The storage gateway SGW includes an LSTRG management unit which includes an LSTRG control unit and an LDISK control unit.

The LSTRG control unit generates the logical storage apparatus LSTRG, based on the NWID (LP), the IP address of the logical storage apparatus (LSTRG), and the LSTRG name which are received from the management apparatus MNG along with the instruction for generating the logical storage apparatus LSTRG. The management apparatus MNG reads the NWID (LP), the IP address of the logical storage apparatus LSTRG, and the LSTRG name from the database USDB illustrated in FIG. 7, and notifies the LSTRG control unit of the read contents.

The LSTRG control unit deletes the logical storage apparatus LSTRG, based on the NWID (LP) and the IP address of the logical storage apparatus LSTRG which are received from the management apparatus MNG along with the instruction for deleting the logical storage apparatus LSTRG.

The LDISK control unit registers the logical disk LDISK in the instructed logical storage apparatus LSTRG, based on the LSTRG name and the ID of the disk apparatus DISK which are received from the management apparatus MNG along with the instruction for adding the logical disk LDISK.

After the logical disk LDISK is registered, the terminal apparatus TM (user US) logs in the IP address of the logical storage apparatus LSTRG through the logical server LSV which is being loaned and thus may access the returned disk apparatus DISK as the logical disk LDISK. That is, even after returning the physical server PSV and the disk apparatus DISK which is linked to the physical server PSV, the terminal apparatus TM may access the disk apparatus DISK without using the logical server LSV on the physical server PSV (e.g., the logical server LSV on the logical platform LP).

The LDISK control unit deletes the logical disk LDISK from the logical storage apparatus LSTRG for which the deletion is instructed, based on the LSTRG name and the number of the connection LDISK which are received from the management apparatus MNG along with the instruction for deleting the logical disk LDISK. Meanwhile, FIG. 12 illustrates a state in which all the accessible logical disks LDISKs are registered in the logical storage apparatuses LSTRG1 and LSTRG2, respectively.

The storage gateway SGW has a virtual network interface for each NWID (LP) which identifies each logical platform LP. For example, when the NWID (LP) is a VLAN ID, a physical network interface eth0 is distributed to virtual network interfaces eth0.1001, eth0.1002, and eth0.1255 which correspond to the VLAN IDs, respectively. The VLAN ID is a value of the NWD (LP) illustrated in FIG. 7.

The switch TOR-SW of the rack RCK in which the storage gateway SGW is installed communicates with the storage gateway SGW by using the packet (for example, tag VLAN) with a tag. Therefore, for example, the logical storage apparatus LSTRG belonging to the logical platform LP1 is not referenced from another logical platform LP2. Therefore, the logical storage apparatuses LSTRGs defined in the plurality of logical platforms LPs may be independently provided by one storage gateway SGW. That is, a storage system complying with a multi-tenant may be built by one storage gateway SGW.

In FIG. 12, plural pieces of software for the logical storage apparatus LSTRG, such as an iSCSI target, is executed on a storage gateway SGW. However, a virtual machine monitor is executed on the storage gateway SGW and the plural pieces of software for the logical storage apparatus LSTRG may be executed on a plurality of virtual machines each connected to the network of the user US.

Figure 13:
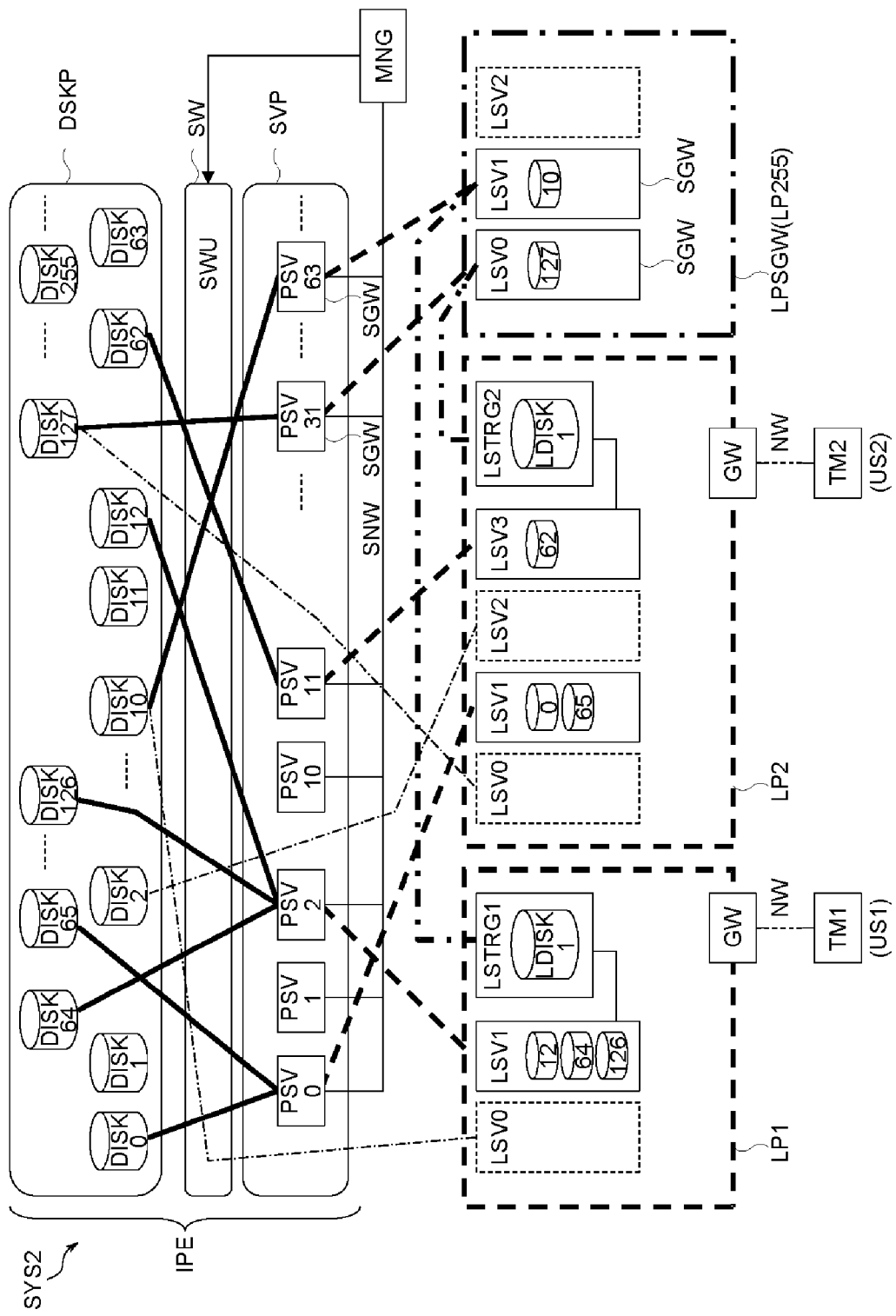
FIG. 13 is a diagram illustrating a connection example of an information processing system illustrated in FIG. 3, according to an embodiment.

FIG. 13 is a diagram illustrating a connection example of the information processing system SYS2 illustrated in FIG. 3, according to an embodiment. Elements which are the same as or similar to the elements illustrated in FIG. 4 are denoted by the same reference numerals and the detailed description thereof will be omitted.

In FIG. 13, the logical server LSV0 defined in the logical platform LP1 is returned in response to a request from the terminal apparatus TM1 (user US1), of which the state is illustrated by the broken-line frame. The management apparatus MNG causes the switch apparatus SW to release the connection between the operation processing apparatus PSV10 and the disk apparatus DISK10, based on the return request for the logical server LSV0. For this reason, a bold broken line which represents the correspondence between the physical server PSV10 and the logical server LSV0 on the logical platform LP1, and a bold solid line which represents the connection between the physical server PSV10 and the disk apparatus DISK10, are deleted in FIG. 4. Further, the returned logical server LSV0 and the disk apparatus DISK10 which was connected to the logical server LSV0 prior to the return are connected to each other by a thin dashed line.

Meanwhile, the management apparatus MNG connects the operation processing apparatus PSV63 and the disk apparatus DISK10 to each other through the switch apparatus SW to build the logical server LSV1 (storage gateway SGW; processing apparatus) on the logical platform LPSGW. The logical server LSV1 on the logical platform LPSGW represents the operation resource of the processing apparatus. The disk apparatus listed in the logical server LSV1 represents the storage resource of the processing apparatus, and numerals attached to the disk apparatus within the logical server LSV shows the number of the disk apparatus DISK which is returned within the disk pool DSKP. Further, the management apparatus MNG provides the operation resource and the storage resource of the logical server LSV1 (processing apparatus) on the logical platform LPSGW to the terminal apparatus TM1 through the network SNW.

For example, the returned disk apparatus DISK10 is defined in the logical platform LP1 as the logical disk LDISK1 of the logical storage apparatus LSTRG1. For this reason, in FIG. 13, a bold sold line is added which represents the connection between the disk apparatus DISK10 and the physical server PSV63 operated as the storage gateway SGW. Further, a bold broken line is added which represents that the physical server PSV63 is allocated as the logical server LSV1 of the logical platform LPSGW. Further, a bold dashed line is added which represents that the logical server LSV1 operated as the storage gateway SGW allocates the disk apparatus DISK10 as the logical disk LDISK1. A line of the logical storage apparatus LSTRG1 and the logical disk LDISK1 is changed from the broken line of FIG. 4 to a solid line which represents that they are being used.

Allocation of the disk apparatus DISK10 as the logical disk LDISK1 by the logical server LSV1 is determined by the value stored in the connection LDISK field of the database DSKDB illustrated in FIG. 9. Further, realization of the storage gateway SGW for the disk apparatus DISK10 by the physical server PSV63 is determined by the value stored in the allocation PSV field of the database LSVDB illustrated in FIG. 10.

Meanwhile, when the terminal apparatus TM1 (e.g., user US1) again requests the loan of the logical server LSV0, the connection state of the information processing system SYS2 is changed from the state illustrated in FIG. 13 to the state illustrated in FIG. 4. The information stored in the disk apparatus DISK separated from the physical server PSV by the return process is kept without being cleared. In this way, the user US may again request the loan of the logical server LSV to use the returned disk apparatus DISK. Further, even after returning the logical server LSV, the user may access the returned disk apparatus DISK through the storage gateway SGW.

FIG. 14 is a diagram illustrating an example of a database PSVDB in the connection state illustrated in FIG. 13, according to an embodiment. In FIG. 14, a shaded region is different from FIG. 8 in terms of the set information.

When the logical server LSV0 (that is, when the physical server PSV10) of the logical platform LP1 is returned, the management apparatus MNG changes the content of the field of the state flag corresponding to the physical server PSV10 from a "loan" state to an "empty" state. Further, the management apparatus MNG changes the field of the state flag corresponding to the physical server PSV63 from the "empty" state to the "loan" state. The states of other fields of the database PSVDB are the same as those of FIG. 8.

Meanwhile, the management apparatus MNG determines whether the logical server LSV0 of the logical platform LP1 corresponds to the physical server PSV10, based on the values stored in the fields for a LPID, a LSVID, and an allocation PSV of the database LSVDB illustrated in FIG. 10. Further, the management apparatus MNG determines whether the logical server LSV1 of the logical platform LPSGW (LP255) corresponds to the physical server PSV63, based on the values stored in the fields for a LPID, a LSVID, and an allocation PSV of the database LSVDB illustrated in FIG. 10.

FIG. 15 is a diagram illustrating an example of a database DSKDB in the connection state illustrated in FIG. 13, according to an embodiment. In FIG. 15, a shaded region is different from FIG. 8 in terms of the set information. When the disk apparatus DISK10 is provided to the logical platform LP1 as the logical disk LDISK1, the management apparatus MNG changes the content of the field of connection PSV corresponding to the disk apparatus DISK10 from "10" to "63". The states of other fields of the database DSKDB are the same as the case of FIG. 9. The management apparatus MNG is configured to beforehand recognize that the storage gateway SGW providing the logical disk LDISK1 is allocated to the physical server PSV63.

FIG. 16 is a diagram illustrating an example of a database LSVDB in the connection state illustrated in FIG. 13, according to an embodiment. In FIG. 16, a shaded region is different from FIG. 10 in terms of the set information. When the logical server LSV0 (that is, the physical server PSV10) of the logical platform LP1 is returned, the management apparatus MNG changes the content of the field of allocation PSV from "10" to "−1" which represents that the logical server LSV0 is not connected to any physical server PSV. The states of other fields of the database LSVDB are the same as the case of FIG. 10.

Figure 17:
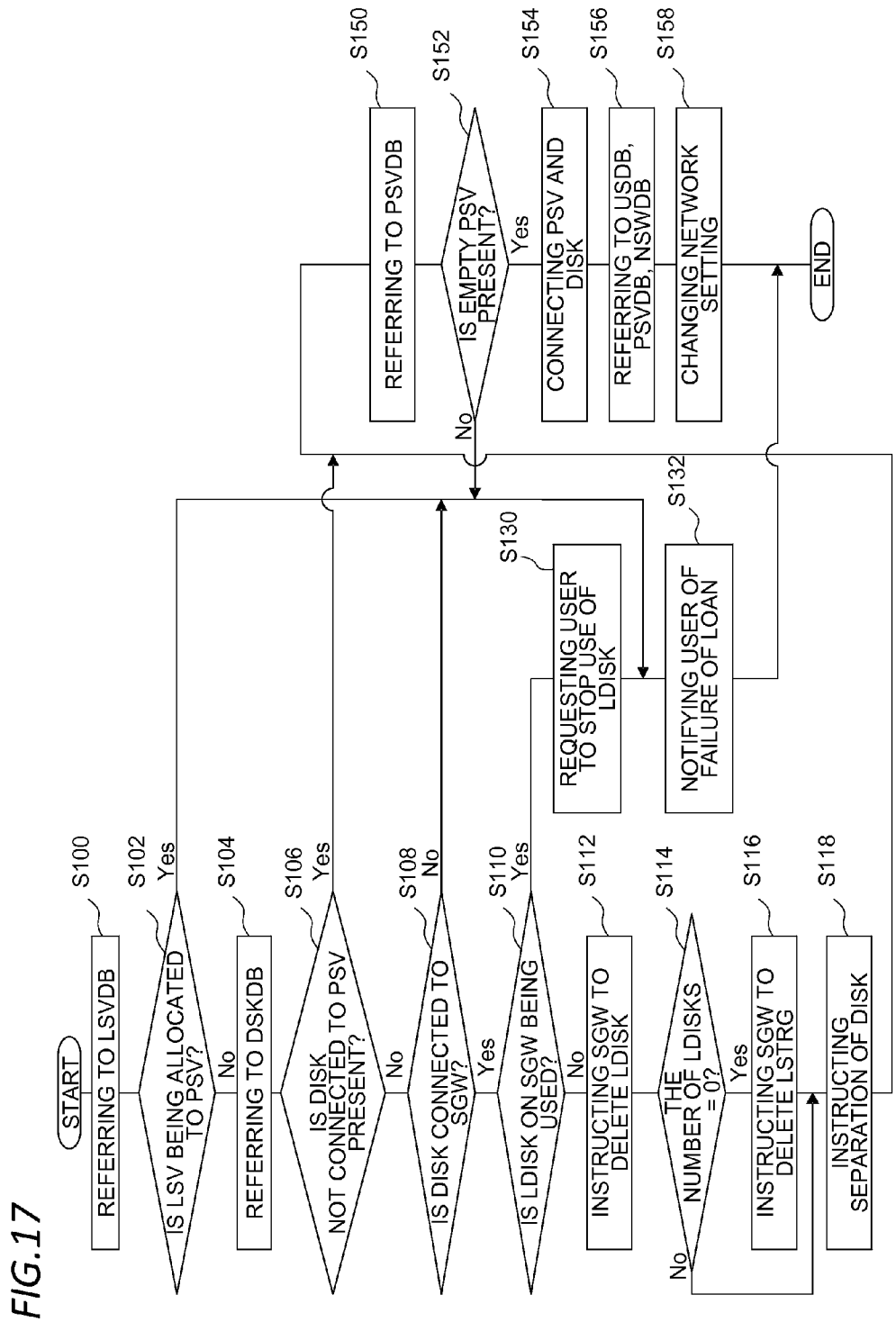
FIG. 17 is a diagram illustrating an example of an operational flowchart for a loan process of a server in an information processing system illustrated in FIG. 3, according to an embodiment.

FIG. 17 is a diagram illustrating an example of an operational flowchart for a loan process of the server PSV in the information processing system SYS2 illustrated in FIG. 3, according to an embodiment. The process illustrated in FIG. 17 is realized by causing the management apparatus MNG to execute the programs. That is, FIG. 17 illustrates an example of the control method of the information processing system SYS2 executed by the management apparatus MNG.

When the loan request for the logical server LSV is received from the terminal apparatus TM (user US), at step S100, the management apparatus MNG refers to the database LSVDB illustrated in FIG. 16 to read the information stored in the field corresponding to the logical server LSV which is requested to be loaned. For example, the value stored in the field of the allocation PSV is read.

Next, at step S102, the management apparatus MNG determines whether the logical server LSV which is requested to be loaned is being allocated to the physical server PSV, based on the value read from the field of the allocation PSV of the database LSVDB. When it is determined that the logical server LSV is not being allocated to the physical server PSV, the processing proceeds to step S104. When the logical server LSV is being allocated to the physical server PSV, the process proceeds to step S132.

At step S104, the management apparatus MNG refers to the database DSKDB illustrated in FIG. 15.

At step S106, the management apparatus MNG determines whether the disk apparatus DISK linked to the logical server LSV which is requested to be loaned is present, based on the information read from the database DSKDB. Further, when it is determined that the disk apparatus DISK linked to the logical server LSV is present, the management apparatus MNG determines whether the physical server PSV is being connected to the disk apparatus DISK, based on the value stored in the field of the connection PSV of the database DSKDB. When it is determined that the physical server PSV is being connected to the disk apparatus DISK, the process proceeds to step S150. When the disk apparatus DISK linked to the logical server LSV which is requested to be loaned is not present or when the physical server PSV is not connected to the disk apparatus DISK, the process proceeds to step S108.

At step S108, the management apparatus MNG determines whether the disk apparatus DISK linked to the logical server LSV which is requested to be loaned is being connected to the storage gateway SGW, based on the value stored in the field of the connection PSV of the database DSKDB. When it is determined that the disk apparatus DISK is being connected to the storage gateway SGW, the processing proceeds to step S110. When the disk apparatus DISK is not connected to the storage gateway SGW, the process proceeds to step S132.

At step S110, the management apparatus MNG determines whether the logical disk LDISK allocating the disk apparatus DISK linked to the logical server LSV which is requested to be loaned is being used in a logical server LSV other than a logical server LSV which is requested to be loaned. For example, the management apparatus MNG inquires the storage gateway SGW whether the logical disk LDISK allocating the disk apparatus DISK is being used, and receives a reply from the storage gateway SGW. When it is determined that the logical disk LDISK is being used, the process proceeds to step S130 to avoid the occurrence of a problem due to the deletion of the logical disk LDISK from the logical storage apparatus LSTRG. Meanwhile, when the disk apparatus DISK is not used as the logical disk LDISK, the process proceeds to step S112, and thus the processing for deleting the logical disk LDISK is executed.

At step S112, the management apparatus MNG reads the name of the logical storage apparatus LSTRG from the LSTRG name field of the database USDB illustrated in FIG. 7. Further, in the database DSKDB illustrated in FIG. 15, the management apparatus MNG reads the unique address of the disk apparatus DISK linked to the logical server LSV which is requested to be loaned and a number assigned to the logical disk LDISK (connection LDISK).

The management apparatus MNG instructs the storage gateway SGW to delete the logical disk LDISK, by notifying the storage gateway SGW of the name of the logical storage apparatus LSTRG, the unique address of the disk apparatus DISK, and the number of the logical disk LDISK. The storage gateway SGW deletes the logical disk LDISK, based on the instruction from the management apparatus MNG.

Next, at step S114, the management apparatus MNG determines the number of other logical disks LDISKs allocated to the logical storage apparatus LSTRG from which the logical disk LDISK is deleted. When the other logical disks LDISKs allocated to the logical storage apparatus LSTRG are not present, the process proceeds to step S116, and thus the processing which deletes the logical storage apparatus LSTRG is executed. When the other logical disks LDISs allocated to the logical storage apparatus LSTRG are present, the process proceeds to step S118.

At step S116, the management apparatus MNG reads the name (LSTRG name) of a logical storage apparatus LSTRG to be deleted, from the database USDB illustrated in FIG. 7. Further, the management apparatus MNG instructs the storage gateway SGW to delete the logical storage apparatus LSTRG, by notifying the storage gateway SGW of the name of the logical storage apparatus LSTRG. The storage gateway SGW deletes the logical storage apparatus LSTRG from the logical platform LP providing the logical server LSV which is requested to be loaned, based on the instruction from the management apparatus MNG.

Meanwhile, when the logical storage apparatus LSTRG to which the logical disk LDISK is not allocated is allowed to be present on the logical platform LP, the processing of steps S114 and S116 may be omitted.

At step S118, the management apparatus MNG reads the number of the physical server PSV allocated to the storage gate SGW which has deleted the logical disk LDISK, from the allocation PSV field of the database LSVDB illustrated in FIG. 16. Further, the management apparatus MNG determines the number of the disk apparatus DISK connected to the physical server PSV allocated to the storage gate SGW, from the database DSKDB illustrated in FIG. 15.

The management apparatus MNG instructs the switch apparatus SW to separate the disk apparatus DISK allocated to the logical disk LDISK from the physical server PSV, by notifyings the switch apparatus SW of the number of the physical server PSV and the number of the disk apparatus DISK. For example, the instruction to separate the disk apparatus DISK from the physical server PSV is executed by the switch control unit SWCNT illustrated in FIG. 6. The switch apparatus SW separates the disk apparatus DISK from the physical server PSV, based on the instruction from the switch control unit SWCNT. That is, the disk apparatus DISK corresponding to the deleted logical disk LDISK is separated from the storage gateway SGW.

Meanwhile, when it is determined that the logical disk LDISK is being used, the management apparatus MNG notifies the terminal apparatus TM of the user US of a stop request for stopping the use of the logical disk LDISK at step S130. For example, the terminal apparatus TM notified of the stop request from the management apparatus MNG causes another logical server LSV accessing the logical disk LDISK to stop access to the logical disk LDISK. Therefore, it is possible to avoid an occasion that the logical disk LDISK which another logical server LSV is accessing is being suddenly blocked, and thus it is possible to improve the reliability of data processing which are executed by the logical server LSV loaned from the information processing system SYS2.

Next, at step S132, the management apparatus MNG notifies the terminal apparatus TM of the user US that the loan of the logical server LSV fails, and ends the loan process.

Meanwhile, at step S150, the management apparatus MNG refers to the database PSVDB illustrated in FIG. 14 to investigate the use situation of the physical server PSV. For example, the physical server PSV of which the state flag is the "empty" state is searched.

At step S152, the management apparatus MNG determines whether the empty physical server PSV is present, based on the search result of the state flag of the database PSVDB. When the empty physical server PSV is present, the process proceeds to step S154, and thus the processing for loaning the empty physical server PSV as the logical server LSV is executed. When the empty physical server PSV is not present, the process proceeds to step S132, and thus the processing for notifying the user US of the loan failure of the logical server LSV is executed.

At step S154, the management apparatus MNG instructs the switch apparatus SW to connect the empty physical server PSV and the disk apparatus DISK, by notifying the switch apparatus SW of the number assigned to the empty physical server PSV and the number assigned to the disk apparatus DISK linked to the logical server LSV which is requested to be loaned. The switch apparatus SW connects the empty physical server PSV and the disk apparatus DISK, based on the instruction from the management apparatus MNG.

Next, at step S156, the management apparatus MNG refers to the database USDB illustrated in FIG. 7, the database PSVDB illustrated in FIG. 14, and the database NSWDB illustrated in FIG. 11. For example, the management apparatus MNG reads the information stored in the field of the IP address range (LP) which corresponds to the user US who has requested a loan, in the database USDB. The management apparatus MNG reads a TOR number corresponding to the empty physical server PSV, a number of the switch TOR-SW stored in the field of the TOR port number, and a port number of the switch TOR-SW, in the database PSVDB. Further, the management apparatus MNG reads an IP address corresponding to the number of the switch TOR-SW read from the database PSVDB, in the database NSWDB.

At step S158, the management apparatus MNG accesses the switch TOR-SW connected to the empty physical server PSV to change the network setting of the switch TOR-SW, based on the information read at step S156. As a result, the empty physical server PSV is loaned to the user US as the logical server LSV, and the loan process ends.

Figure 18:
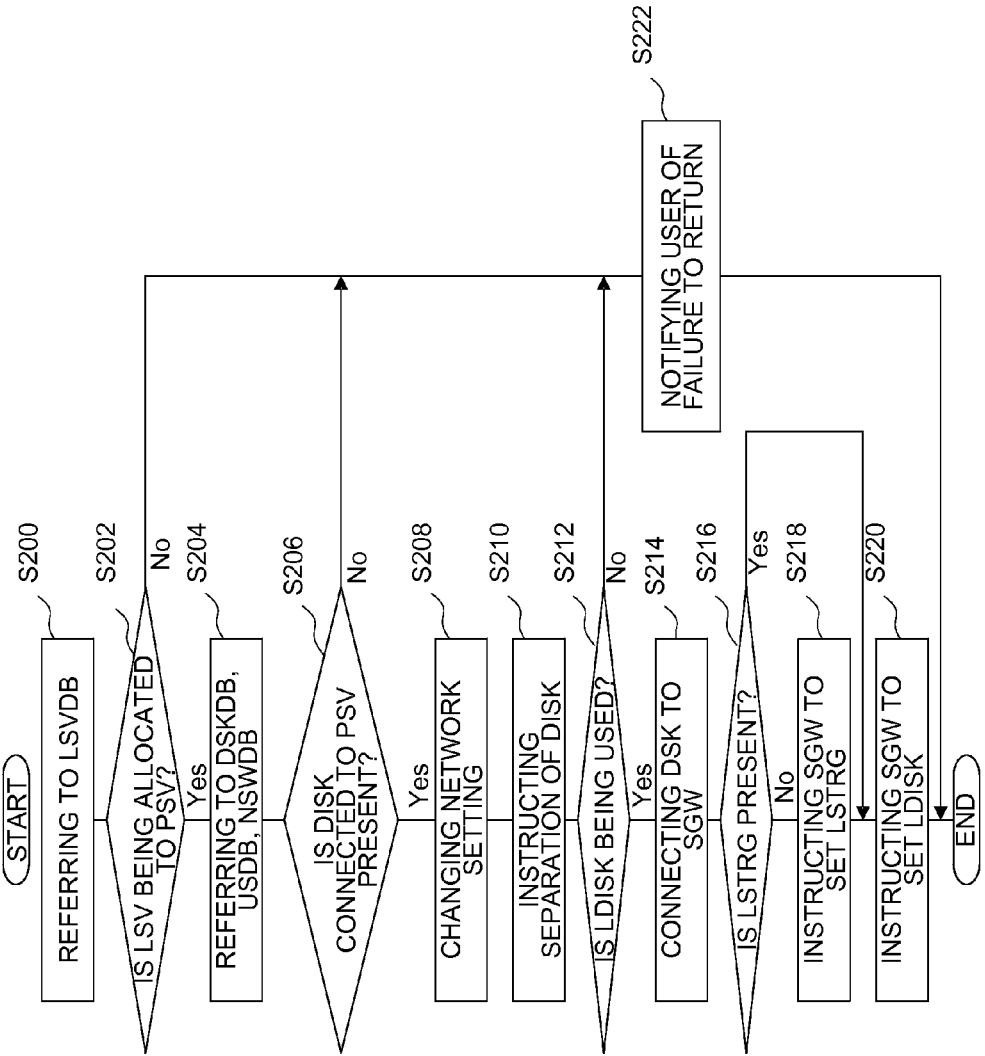
FIG. 18 is a diagram illustrating an example of an operational flowchart for a return process of a server in an information processing system illustrated in FIG. 3, according to an embodiment.

FIG. 18 is a diagram illustrating an example of an operational flowchart for a return process of the server PSV in the information processing system SYS2 illustrated in FIG. 3, according to an embodiment. The processing illustrated in FIG. 18 is realized by causing the management apparatus MNG to execute the programs. That is, FIG. 18 illustrates an example of the control method of the information processing system SYS2 executed by the management apparatus MNG.

When the return request for the logical server LSV is received from the terminal apparatus TM (user US), the management apparatus MNG refers to the database LSVDB illustrated in FIG. 10 to read the information stored in the field corresponding to the logical server LSV which is requested to be returned at step S200. For example, the value stored in the field of the allocation PSV is read.

Next, at step S202, the management apparatus MNG determines whether the logical server LSV which is requested to be returned is being allocated to the physical server PSV, based on the value read from the field of the allocation PSV of the database LSVDB. When it is determined that the logical server LSV is being allocated to the physical server PSV, the process proceeds to step S204. When the logical server LSV is not being allocated to the physical server PSV, the processing proceeds to step S222.

At step S204, the management apparatus MNG refers to the database DSKDB illustrated in FIG. 15, the database USDB illustrated in FIG. 7, and the database NSWDB illustrated in FIG. 11.

At step S206, the management apparatus MNG determines whether the physical server PSV allocated as the logical server LSV which is requested to be returned, and the disk apparatus DISK connected to the physical server PSV are present, based on the information read from the database DSKDB. When it is determined that the physical server PSV and the disk apparatus DISK are present, the process proceeds to step S208. When the physical server PSV and the disk apparatus DISK are not present, the processing proceeds to step S222.

At step S208, the management apparatus MNG changes the network setting of the switch TOR-SW connected to the physical server PSV allocated as the logical server LSV which is requested to be returned, based on the information read at step S204. As a result, a network path to the physical server PSV allocated as the logical server LSV which is requested to be returned is blocked.

Next, at step S210, the management apparatus MNG reads a number of the physical server PSV allocated as the logical server LSV which is requested to be returned, from the allocation PSV field of the database LSVDB illustrated in FIG. 10. Further, the management apparatus MNG reads a number of the disk apparatus DISK connected to the logical server LSV which is requested to be returned, from the field of the DISK list of the database LSVDB.

The management apparatus MNG notifies the switch apparatus SW of a number of the physical server PSV and a number of the disk apparatus DISK to instruct the separation of the disk apparatus DISK allocated to the logical disk LDISK from the physical server PSV. For example, the instruction to separate the disk apparatus DISK from the physical server PSV is executed by the switch control unit SWCNT illustrated in FIG. 6. The switch apparatus SW separates the disk apparatus DISK from the physical server PSV, based on the instruction from the switch control unit SWCNT.

Next, at step S212, the management apparatus MNG determines whether the disk apparatus DISK corresponding to the logical server LSV which is requested to be returned is being used as the logical disk LDISK. When it is determined that the logical disk LDISK is being used, the process proceeds to step S214. Otherwise, when the disk apparatus DISK is not being used as the logical disk LDISK, the processing proceeds to step S222.

Next, at step S214, the management apparatus MNG reads a number of the physical server PSV from the field of the allocation PSV of the storage gateway SGW corresponding to the logical server LSV which is requested to be returned, in the database LSVDB illustrated in FIG. 10. Further, the management apparatus MNG notifies the switch apparatus SW of the number of the physical server PSV and the number of the disk apparatus DISK notified at step S210 to instruct the connection between the disk apparatus DISK and the physical server PSV operated as the storage gateway SGW. For example, the instruction to connect the physical server PSV and the disk apparatus DISK is executed by the switch control unit SWCNT illustrated in FIG. 6. The switch apparatus SW connects the disk apparatus DISK and the physical server PSV based on the instruction from the switch control unit SWCNT.

At step S216, the management apparatus MNG determines whether the logical storage apparatus LSTRG is present on the logical platform LP corresponding to the logical server LSV which is requested to be returned. For example, the management apparatus MNG determines that the storage apparatus LSTRG is present, when the state flag of the physical server PSV corresponding to the storage gateway SGW indicates that the PSV is being loaned, in the database PSVDB illustrated in FIG. 8. When it is determined that the logical storage apparatus LSTRG is present, the process proceeds to step S220. Otherwise, when the logical storage apparatus LSTRG is not present, the process proceeds to step S218, and thus the processing to set the logical storage apparatus LSTRG on the logical platform LP is executed.

At step S218, the management apparatus MNG reads a name of the logical storage apparatus LSTRG to be set, from the LSTRG name of the database USDB illustrated in FIG. 7. Further, the management apparatus MNG notifies the storage gateway SGW, which corresponds to the logical platform providing the logical server LSV which is requested to be returned, of the information within the database USDB illustrated in FIG. 7 to instruct setting of the logical storage apparatus LSTRG.

For example, the management apparatus MNG notifies the name (LSTRG name) of the LSTRG, the IP address (LSTRG), and the NWID (LP) (for example, VLANID) representing the logical platform (LP). The storage gateway SGW sets the logical storage apparatus LSTRG on the logical platform LP on which the logical server LSV which is requested to be returned is defined, based on the instruction from the management apparatus MNG.

Next, at step S220, the management apparatus MNG reads the name of the logical storage apparatus LSTRG from the field of the LSTRG name of the database USDB illustrated in FIG. 7. Further, in the database DSKDB illustrated in FIG. 9, the management apparatus MNG reads a unique address of the disk apparatus DISK linked to the logical server LSV which is requested to be returned and a number of the logical disk LDISK (connection LDISK).

The management apparatus MNG notifies the storage gateway SGW, which corresponds to the logical platform LP providing the logical server LSV which is requested to be returned, of the name of the logical storage apparatus LSTRG and the number of the logical disk LDISK and the unique address of disk apparatus DISK. Further, the management apparatus MNG instructs the storage gateway SGW to set the logical disk LDISK. The storage gateway SGW sets the logical disk LDISK, based on the instruction from the management apparatus MNG, and the return process ends.

Meanwhile, at step S222, the management apparatus MNG notifies the terminal apparatus TM of the user US that the return of the logical server LSV fails, and ends the return process. It is possible to detect, for example, errors, and the like of the programs, which the terminal apparatus TM executes by using the logical server LSV, by notifying the terminal apparatus TM (user US) that the return of the logical server LSV fails.

Figure 19:
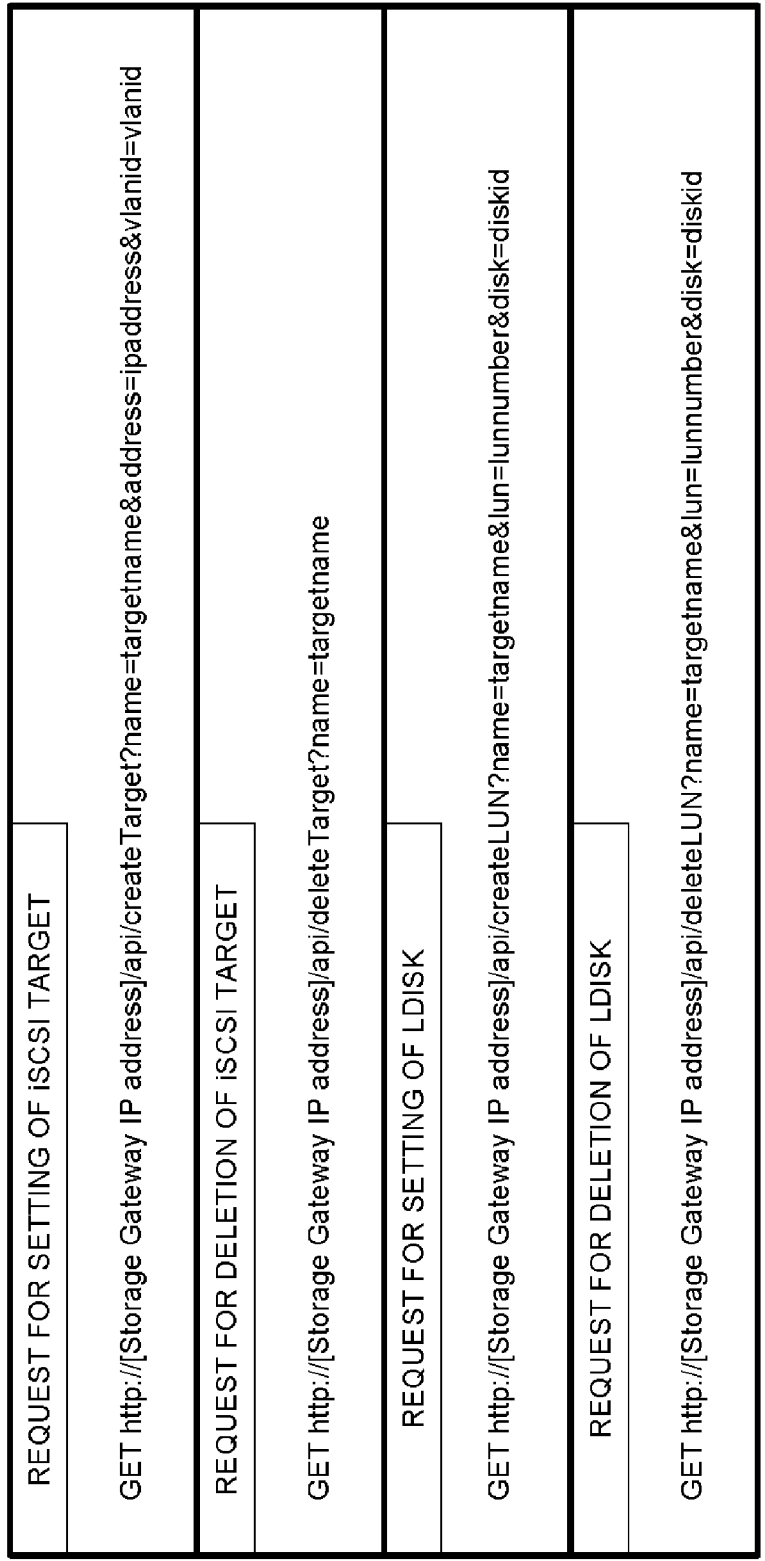
FIG. 19 is a diagram illustrating an example of communications between a management apparatus and a storage gateway illustrated in FIG. 3, according to an embodiment.

FIG. 19 is a diagram illustrating an example of communications between the management apparatus MNG and the storage gateway SGW which are illustrated in FIG. 3, according to an embodiment. For example, the management apparatus MNG and the storage gateway SGW include a Web Application Programming Interface (API) communicating with each other by using a hyper text transfer protocol (HTTP). For example, the Web API is based on a REpresentational State Transfer (REST).

FIG. 19 illustrates an example of the setting and the deletion request of the SCSI target, and the setting and the deletion request for the logical disk LDISK, which the management apparatus MNG issues to the storage gateway SGW. Meanwhile, the management apparatus MNG and the storage gateway SGW may communicate with each other using a protocol other than HTTP.

In FIG. 19, "Target" and "LUN (or lun)" represent the logical storage apparatus LSTRG and the logical disk LDISK, respectively, and "disk" represents the disk apparatus DISK. Parameters "targetname", "ipaddress", and "vlanid" represent the LSTRG name, the IP address (LSTRG), and the NWID (LP), respectively, which are illustrated in FIG. 7. Parameters "lunnumber" and "diskid" represent the connection LDISK and the unique address, respectively, which are illustrated in FIGS. 9 and 15.

Figure 20:
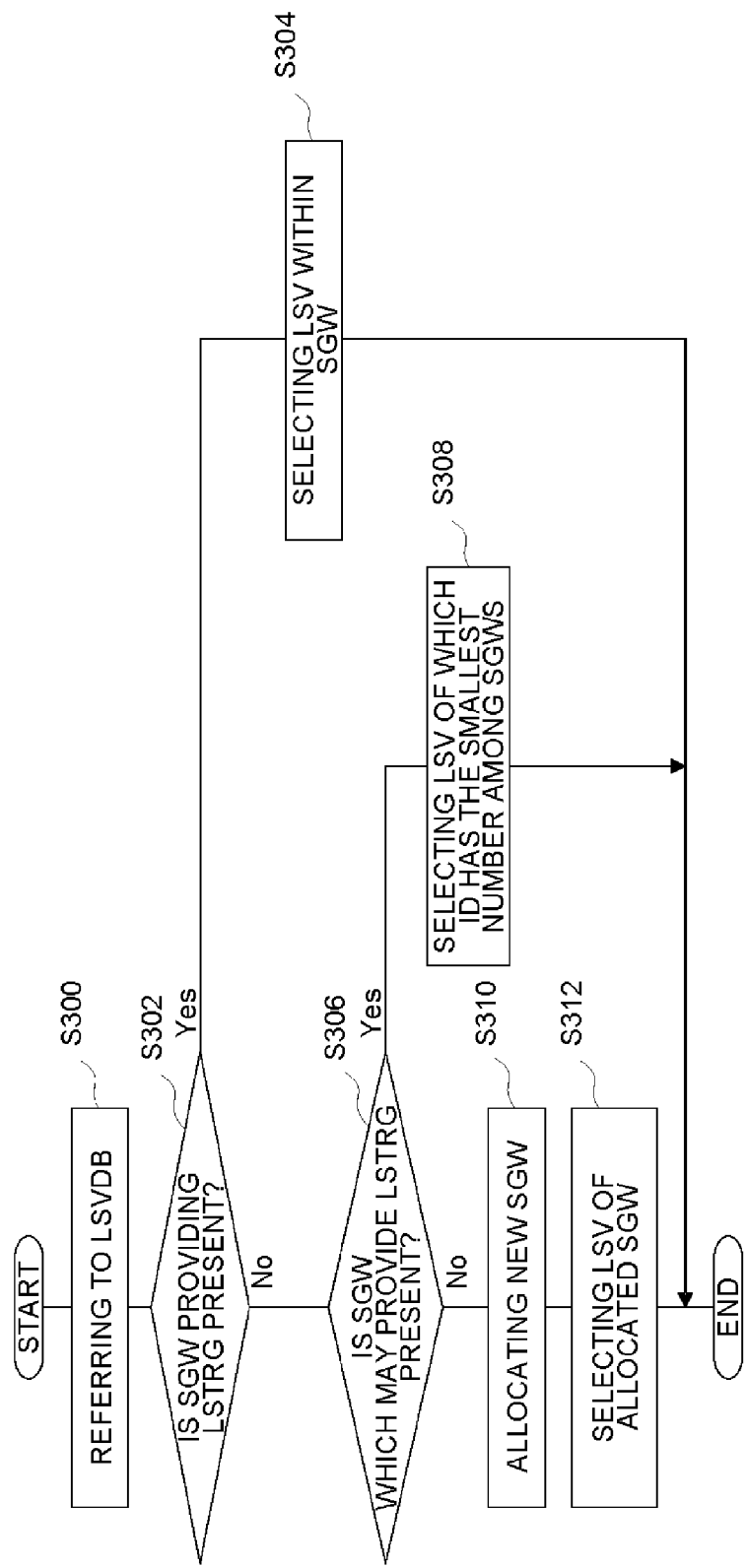
FIG. 20 is a diagram illustrating an example of an operational flowchart for a selection process of a plurality of storage gateways in the information processing system illustrated in FIG. 3, according to an embodiment.

FIG. 20 is a diagram illustrating an example of an operational flowchart for the selection process of the plurality of storage gateways SGWs in the information processing system SYS2 illustrated in FIG. 3, according to an embodiment. For example, the processing illustrated in FIG. 20 is executed when the logical storage apparatus LSTRG is set at step S218 and when the logical disk LDISK is set at step S220, in the return process illustrated in FIG. 18. Meanwhile, at steps S218 and S220, when a single storage gateway SGW is used, the processing of FIG. 20 is not executed. Further, the processing illustrated in FIG. 20 is realized by causing the management apparatus MNG to execute the programs. That is, FIG. 20 illustrates an example of the control method of the information processing system SYS2 executed by the management apparatus MNG.

First, at step S300, the management apparatus MNG refers to the LSTRG name list of the database LSVDB illustrated in FIG. 10 to read the name of the logical storage apparatus LSTRG which is being executed by each of the storage gateways SGWs.

Next, at step S302, the management apparatus MNG determines whether the storage gateway SGW, which is providing the logical storage apparatus LSTRG, is present, based on the name of the logical storage apparatus LSTRG read at step S300. That is, the management apparatus MNG determines whether the logical storage apparatus LSTRG is present in the logical platform LP to which the return request for the logical server LSV is submitted.

When it is determined that the storage gateway SGW, which is providing the logical storage apparatus LSTRG, is present, the process proceeds to step S304. Otherwise, when the storage gateway SGW, which is providing the logical storage apparatus LSTRG, is not present, the processing proceeds to step S306. Meanwhile, the process of step S304 is executed in the processing of step S220 illustrated in FIG. 18, and step S306 and the subsequent processing are executed in the processing of step S218 illustrated in FIG. 18.

At step S304, the management apparatus MNG selects the logical server LSV allocated to the storage gateway SGW, which is providing the logical storage apparatus LSTRG, and ends the process illustrated in FIG. 20. Next, the management apparatus MNG instructs the storage gateway SGW corresponding to the logical platform LP, which provides the logical server LSV which is requested to be returned, to set the logical disk LDISK, at step S220 illustrated in FIG. 18.

When the storage gateway SGW, which is providing the logical storage apparatus LSTRG, is not present, at step S306, the management apparatus MNG determines whether the storage gateway SGW, which is capable of providing a logical storage apparatus LSTRG, is present. That is, the management apparatus MNG determines whether there exists a storage gateway SGW providing logical storage apparatuses LSTRGs whose number is less than an upper limit value, among the storage gateways SGWs which are allocating the physical server PSV.

When it is determined that there exists a storage gateway SGW capable of providing a logical storage apparatus LSTRG, the processing proceeds to step S308. Otherwise, when there exists no storage gateway SGW capable of providing the logical storage apparatus LSTRG, the process proceeds to step S310.

At step S308, the management apparatus MNG selects, for example, the storage gateway SGW of which the ID is the smallest number, among the storage gateways SGWs capable of providing the logical storage apparatus LSTRG. Meanwhile, the management apparatus MNG may select a storage gateway SGW providing the LSTRGs whose number is less than those provided by the other storage gateways SGWs.

Meanwhile, when there exists no storage gateway SGW capable of providing the logical storage apparatus LSTRG, the management apparatus MNG selects the empty logical server LSV which is not allocated as the storage gateway SGW at step S310. When the plurality of empty logical servers LSVs, which are not allocated as the storage gateway SGW, are present, the management apparatus MNG selects the logical server LSV having a number smaller than the numbers of the other logical servers LSVs. Further, the management apparatus MNG starts a physical server PSV to which the logical server LSV is allocated, and allocates the physical server PSV as a new storage gateway SGW. When a logical server LSV for allocating the storage gateway SGW becomes insufficient, a new physical server PSV corresponding to a new logical server LSV is started, thereby allowing the power consumption of the information processing system SYS2 to be more reduced than the case in which a physical server PSV is started at all times.

Next, at step S312, the management apparatus MNG selects a logical server LSV corresponding to the storage gateway SGW, which is allocated at step S310, and ends the process illustrated in FIG. 20. Next, at step S218 illustrated in FIG. 18, the management apparatus MNG instructs the storage gate SGW corresponding to the logical server LSV selected at step S312 to set the logical storage apparatus LSTRG.

FIG. 21 is a diagram illustrating an example of an operational flowchart for a loan process of a server using a plurality of storage gateways SGWs in the information processing system SYS2 illustrated in FIG. 3, according to an embodiment. The process illustrated in FIG. 21 is realized by causing the management apparatus MNG to execute the programs. That is, FIG. 21 illustrates an example of the control method of the information processing system SYS2 executed by the management apparatus MNG. Processing, which is the same as or similar to that of FIG. 17, is denoted by the same reference numerals and the detailed description thereof will be omitted.

FIG. 21 illustrates that steps S140, S142, and S144 are added to FIG. 17. The processing of steps S100 to S118, S130, S132, and S150 to S158 is the same as the case of FIG. 17.

Step S140 is executed after the processing of step S118. At step S140, the management apparatus MNG determines whether the number of logical storage apparatuses LSTRGs present on the corresponding storage gateway SGW becomes "0" by the loan process of the logical server LSV. For example, when the storage apparatus LSTRG is deleted from the storage gateway SGW in which one storage apparatus LSTRG is set, the number of logical storage apparatuses LSTRGs present on the storage gateway SGW becomes "0".

When it is determined that the number of logical storage apparatuses LSTRGs present on the storage gateway SGW becomes "0", the process proceeds to step S142. Otherwise, when the number of logical storage apparatuses LSTRGs present on the storage gateway SGW is not "0", the process proceeds to step S150.

At step S142, the management apparatus MNG instructs shut-down of the storage gateway SGW in which a logical storage apparatus LSTRG is not present. The storage gateway SGW executes the shut-down processing, based on the instruction from the management apparatus MNG, to stop the operation. When the logical server LSV allocating the storage gateway SGW remains, the physical server PSV corresponding to the remaining logical server LSV is stopped, thereby allowing the power consumption of the information processing system SYS2 to be more reduced than the case in which a physical server PSV is started at all times.

At step S144, the management apparatus MNG changes the network setting of the switch TOR-SW connected to the physical server PSV operated as the storage gateway SGW, similar to step S208 illustrated in FIG. 18. Therefore, the network path to the physical server PSV operated as the storage gateway SGW is blocked.

The operation of the storage gateway SGW in which a logical storage apparatus LSTRG is not present is stopped by the loan process of the logical server LSV. As a result, the power consumption of the information processing system SYS2 may be reduced.

As described above, similar to the embodiments illustrated in FIGS. 1 and 2, even in the embodiments illustrated in FIGS. 3 to 21, for example, after returning the logical server LSV0 corresponding to the physical server PSV10, the terminal apparatus TM1 may access the disk apparatus DISK10. That is, the terminal apparatus TM1 may refer to the information, which is recorded in the disk apparatus DISK10 during the loan of the logical server LSV0, while the logical server LSV0 is being returned. Further, the terminal apparatus TM1 may refer to data, and the like, which are stored in the disk apparatus DISK1 (logical disk LDISK1) during the return of the logical server LSV1 after receiving the loan of the logical server LSV1 again.

In the embodiments illustrated in FIGS. 3 to 21, the physical server PSV corresponding to the logical server LSV which allocates the storage gateway SGW is started or stopped depending on the state of providing the logical storage apparatus LSTRG. Therefore, the power consumption of the information processing system SYS2 may be more reduced than the case in which the physical server PSV is started all the times. Further, the logical storage apparatuses LSTRGs defined in the plurality of logical platforms LP may be independently provided by each of the storage gateways SGWs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
   an information processing apparatus including a plurality of operation processing apparatuses, a plurality of disk apparatuses, and a switch apparatus which connects any one of the plurality of operation processing apparatuses to any one of the plurality of disk apparatuses;
   a plurality of terminal apparatuses connected to the plurality of operation processing apparatuses through a network; and
   a management apparatus configured to:
      in response to a first loan request from a first terminal apparatus,
         provide the first terminal apparatus access to a first operation resource of a first operation processing apparatus and a first storage resource of a first disk apparatus via a first processing apparatus in which the first operation processing apparatus among the plurality of operation processing apparatuses and the first disk apparatus among the plurality of disk apparatuses are connected with each other through the switch apparatus, and
      in response to a return request of the first processing apparatus from the first terminal apparatus,
         release the connection between the first operation processing apparatus and the first disk apparatus through the switch apparatus, and
         provide the first terminal apparatus access to the first storage resource of the first disk apparatus via a second operation resource of a second processing apparatus in which a second operation processing apparatus among the plurality of operation processing apparatuses and the first disk apparatus are connected with each other through the switch apparatus such that the first terminal apparatus may continue to access the first storage resource of the first disk apparatus using the second operation resource of the second processing apparatus after returning the first processing apparatus.

2. The information processing system of claim 1, wherein in response to a second loan request for the first operation processing apparatus which has released the connection with the first disk apparatus in response to the return request, the management apparatus provides the first operation resource and the first storage resource of the first processing apparatus, in which the first operation processing apparatus and the first disk apparatus are connected with each other through the switch apparatus, to the terminal apparatus through the network, while releasing the connection between the second operation processing apparatus and the first disk apparatus through the switch apparatus.

3. The information processing system of claim 2, wherein the second operation processing apparatus is configured to allocate a logical storage apparatus defining the first storage resource to be provided for the plurality of terminal apparatuses, to each of the plurality of terminal apparatuses; and the management apparatus is further configured to start a third operation processing apparatus among the plurality of operation processing apparatuses and allocate a new logical storage apparatus to the started third operation processing apparatus, when a number of logical storage apparatuses that is to be allocated to the second operation processing apparatus in response to the return request exceeds a predetermined number.

4. The information processing system of claim 3, wherein the second operation processing apparatus deletes the logical storage apparatus that has released the defined first storage resource when stopping provision of the first storage resource to the terminal apparatus in response to the second loan request; and the management apparatus stops operation of the second operation processing apparatus from which the allocated logical storage apparatus has been deleted.

5. The information processing system of claim 2, wherein the management apparatus is further configured to issue a request to the terminal apparatus for stopping use of the first storage resource by the third operation resource when the first storage resource, of which provision to the terminal apparatus by the second operation processing apparatus is to be stopped in response to the second loan request, is being used by a third operation resource being provided to the terminal apparatus.

6. A management apparatus managing an information processing apparatus including a plurality of operation processing apparatuses, a plurality of disk apparatuses, and a switch apparatus which connects any one of the plurality of operation processing apparatuses to any one of the plurality of disk apparatuses, the management apparatus comprising:
a processor configured to:
in response to a first loan request from a first terminal apparatus connected to the plurality of operation processing apparatuses through a network,
provide the first terminal apparatus access to a first operation resource of a first operation processing apparatus and a first storage resource of a first disk apparatus via a first processing apparatus, in which the first operation processing apparatus among the plurality of operation processing apparatuses and the first disk apparatus among the plurality of disk apparatuses are connected with each other through the switch apparatus, and
in response to a return request of the first processing apparatus from the first terminal apparatus,
release the connection between the first operation processing apparatus and the first disk apparatus through the switch apparatus, and
provide the first terminal apparatus access to the first storage resource of the first disk apparatus via a second operation resource of a second processing apparatus, in which a second operation processing apparatus among the plurality of operation processing apparatuses and the first disk apparatus are connected with each other through the switch apparatus such that the first terminal apparatus may continue to access the first storage resource of the first disk apparatus using the second operation resource of the second processing apparatus after returning the first processing apparatus; and
a memory configured to store information on the information processing apparatus.

7. A control method of an information processing system including an information processing apparatus including a plurality of operation processing apparatuses, a plurality of disk apparatuses, and a switch apparatus which connects any of the plurality of operation processing apparatuses to any of the plurality of disk apparatuses, and a management apparatus managing the information processing apparatus, the control method comprising:
providing by the management apparatus, in response to a first loan request from a first terminal apparatus connected to the plurality of operation processing apparatuses through a network, the first terminal apparatus access to a first operation resource of a first operation processing apparatus and a first storage resource of a first disk apparatus via a first processing apparatus in which the first operation processing apparatus among the plurality of operation processing apparatuses and the first disk apparatus among the plurality of disk apparatuses are connected with each other through the switch apparatus; and
in response to a return request of the first processing apparatus from the first terminal apparatus,
releasing, by the management apparatus, the connection between the first operation processing apparatus and the first disk apparatus through the switch apparatus, and
providing, by the management apparatus, the first terminal apparatus access to the first storage resource of the first disk apparatus via a second operation resource of the second processing apparatus, in which the second operation processing apparatus among the plurality of operation processing apparatuses and the first disk apparatus are connected with each other through the switch apparatus such that the first terminal apparatus may continue to access the first storage resource of the first disk apparatus using the second operation resource of the second processing apparatus after returning the first processing apparatus.

* * * * *